US012749214B2

(12) United States Patent
Sivaraman et al.

(10) Patent No.: US 12,749,214 B2
(45) Date of Patent: Sep. 29, 2026

(54) THREE-DIMENSIONAL POSE ESTIMATION USING TWO-DIMENSIONAL IMAGES

(71) Applicant: NVIDIA Corporation, Santa Clara, CA (US)

(72) Inventors: Sakthivel Sivaraman, Sunnyvale, CA (US); Arjun Guru, Mountain View, CA (US); Rajath Shetty, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 258 days.

(21) Appl. No.: 18/349,842

(22) Filed: Jul. 10, 2023

(65) Prior Publication Data

US 2025/0022155 A1 Jan. 16, 2025

(51) Int. Cl.
*G06T 7/70* (2017.01)
*G06T 7/50* (2017.01)
(Continued)

(52) U.S. Cl.
CPC .................. *G06T 7/70* (2017.01); *G06T 7/50* (2017.01); *G06T 7/60* (2013.01); *G06T 7/80* (2017.01);
(Continued)

(58) Field of Classification Search
CPC .... G06T 7/70; G06T 7/50; G06T 7/60; G06T 7/80; G06T 15/205; G06T 2207/20044;
(Continued)

(56) References Cited

U.S. PATENT DOCUMENTS 7,379,195 B2 5/2008 Yoon et al.
10,140,533 B1 11/2018 Chan et al.
(Continued)

FOREIGN PATENT DOCUMENTS

WO 2020/205597 A1 10/2020

OTHER PUBLICATIONS

International Search Report and Written Opinion received for PCT Patent Application No. PCT/US2024/036758, mailed on Oct. 31, 2024, 14 pages.
(Continued)

*Primary Examiner* — Solomon G Bezuayehu
(74) *Attorney, Agent, or Firm* — SHOOK, HARDY & BACON L.L.P.

(57) ABSTRACT

In various examples, systems and methods for pose detection model training for predicting three-dimensional pose estimates using two-dimensional image data are provided. The occupant pose detection model may be trained using multi-view image sensor training data that includes image frames that capture a pose of a training subject within a machine interior using multiple synchronized optical image sensors placed around the machine interior that produce a set of captured image frames of the training subject from different viewpoints. Based on the multi-view image sensor training data, the occupant pose detection model may generate a set of individual, predicted 3D pose estimates for the training subject from a captured image frame from each of the respective optical image sensors. To adjust the occupant pose detection model during training, a loss feedback may be generated that comprises a pose alignment loss, a pose depth loss, and/or a ground truth kinematic loss.

18 Claims, 14 Drawing Sheets

(51) Int. Cl.
*G06T 7/60* (2017.01)
*G06T 7/80* (2017.01)
*G06T 15/20* (2011.01)

(52) U.S. Cl.
CPC .. *G06T 15/205* (2013.01); *G06T 2207/20044* (2013.01)

(58) Field of Classification Search
CPC . G06T 2207/20081; G06T 2207/20084; G06T 2207/30196; G06T 2207/30268; G06T 7/55
See application file for complete search history.

(56) References Cited

U.S. PATENT DOCUMENTS

| | | | |
|---|---|---|---|
| 10,147,007 | B1 | 12/2018 | Chan et al. |
| 10,885,698 | B2 | 1/2021 | Muthler et al. |
| 10,967,824 | B1 | 4/2021 | Pertsel et al. |
| 11,144,754 | B2 | 10/2021 | Hu et al. |
| 11,270,425 | B2 * | 3/2022 | Liao .......................... G06T 7/70 |
| 11,348,279 | B1 * | 5/2022 | Akbas .................. G06V 10/763 |
| 11,713,600 | B1 | 8/2023 | Weng |
| 2003/0209893 | A1 | 11/2003 | Breed et al. |
| 2005/0201612 | A1 | 9/2005 | Park et al. |
| 2006/0208169 | A1 | 9/2006 | Breed et al. |
| 2017/0200082 | A1 | 7/2017 | Böhm |
| 2019/0236809 | A1 * | 8/2019 | Graziosi ................... G06T 7/10 |
| 2019/0378294 | A1 * | 12/2019 | Zhang ....................... G06T 7/70 |
| 2020/0342270 | A1 * | 10/2020 | Biswas ................ G06N 3/0895 |
| 2020/0376675 | A1 | 12/2020 | Bai et al. |
| 2020/0402251 | A1 | 12/2020 | Ban et al. |
| 2021/0052176 | A1 | 2/2021 | Sarely et al. |
| 2021/0105619 | A1 | 4/2021 | Kashani et al. |
| 2021/0150726 | A1 * | 5/2021 | Kao ........................ G06T 7/168 |
| 2021/0182609 | A1 | 6/2021 | Arar et al. |
| 2021/0248772 | A1 * | 8/2021 | Iqbal ........................ G06N 5/04 |
| 2021/0256717 | A1 | 8/2021 | Lin et al. |
| 2021/0276511 | A1 | 9/2021 | Galan-Oliveras et al. |
| 2022/0067410 | A1 | 3/2022 | Raz et al. |
| 2022/0292289 | A1 | 9/2022 | Shalumov et al. |
| 2022/0292705 | A1 | 9/2022 | Friedman et al. |
| 2022/0300072 | A1 | 9/2022 | Arar et al. |
| 2022/0379831 | A1 | 12/2022 | Nakamura et al. |
| 2022/0388527 | A1 | 12/2022 | Barth et al. |
| 2023/0168364 | A1 | 6/2023 | Podkamien et al. |
| 2023/0326051 | A1 * | 10/2023 | Jung ......................... G06T 7/50 |
| 2023/0342902 | A1 * | 10/2023 | Manafiazar ........... G06T 7/0002 |
| 2024/0071106 | A1 | 2/2024 | Kito et al. |
| 2024/0104879 | A1 | 3/2024 | Jiang et al. |
| 2024/0104941 | A1 | 3/2024 | Ren et al. |
| 2024/0199062 | A1 | 6/2024 | Park |
| 2024/0265554 | A1 | 8/2024 | Gronau |
| 2024/0290112 | A1 | 8/2024 | Hempel et al. |
| 2024/0308456 | A1 | 9/2024 | Ghannam et al. |
| 2024/0354980 | A1 | 10/2024 | Rehfeld et al. |
| 2024/0404166 | A1 * | 12/2024 | Liu ........................... G06T 7/50 |
| 2024/0412452 | A1 * | 12/2024 | Zheng ..................... G06T 17/00 |
| 2025/0022289 | A1 | 1/2025 | Sivaraman et al. |
| 2025/0022290 | A1 | 1/2025 | Sivaraman et al. |

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

Domhof, J., et al., "An Extrinsic Calibration Tool for Radar, Camera and Lidar", International Conference on Robotics and Automation (ICRA), pp. 7 (2019).

U.S. Appl. No. 17/935,473, filed Sep. 26, 2022, titled "Multi-Modal Sensor Calibration for In-Cabin Monitoring Systems and Applications".

U.S. Appl. No. 17/935,465, filed Sep. 26, 2022, titled "Sensor Calibration Using Fiducial Markers for In-Cabin Monitoring Systems and Applications".

Otto, M., M., et al., "Presenting a Holistic Framework for Scalable, Marker-less Motion Capturing: Skeletal Tracking Performance Analysis, Sensor Fusion Algorithms and Usage in Automotive Industry", Journal of Virtual Reality and Broadcasting, vol. 13, No. 3, pp. 1-16 (2016).

"Kinect", Wikipedia, Retrieved from Internet URL : https://en.wikipedia.org/wiki/Kinect, accessed on Mar. 22, 2023, pp. 28.

Esfahani et al., "A Survey of State-of-the-art Gan-based Approaches To Image Synthesis", Department of Computer Science, Jul. 13, 2019, pp. 63-76.

International Search Report and Written Opinion received for PCT Patent Application No. PCT/US2024/036754, mailed on Oct. 25, 2024, 14 pages.

International Search Report and Written Opinion received for PCT Patent Application No. PCT/US2024/036762, mailed on Oct. 14, 2024, 14 pages.

Kuchar et al., "Passenger Occupancy Estimation in Vehicles: A Review of Current Methods and Research Challenges", Sustainability, vol. 15, No. 2, 2023, pp. 1-27.

Moussa et al., "Visual-Based Children and Pet Rescue from Suffocation and Incidence of Hyperthermia Death in Enclosed Vehicles", Sensors 2023, vol. 23, Aug. 8, 2023, pp. 1-15.

Non-Final Office Action received for U.S. Appl. No. 18/219,969, mailed on Jul. 11, 2025, 14 pages.

Non-Final Office Action received for U.S. Appl. No. 18/349,853, mailed on Jul. 11, 2025, 15 pages.

Notice of Allowance received for U.S. Appl. No. 18/349,827, mailed on Jul. 11, 2025, 14 pages.

Zeng et al., "WiCPD: Wireless Child Presence Detection System for Smart Cars", IEEE Internet of Things Journal, vol. 9, No. 24, Dec. 15, 2021, pp. 24866-24881.

Final Office Action received for U.S. Appl. No. 18/219,969, mailed on Feb. 25, 2026, 15 pages.

Notice of Allowance received for U.S. Appl. No. 18/349,853, mailed on Feb. 18, 2026, 9 pages.

* cited by examiner

Sensor Station 1 Viewpoint

Sensor Station 2 Viewpoint

Sensor Station 3 Viewpoint

Sensor Station 4 Viewpoint

THREE-DIMENSIONAL POSE ESTIMATION USING TWO-DIMENSIONAL IMAGES

CROSS-REFERENCE TO RELATED APPLICATIONS

This application is related to U.S. patent application Ser. No. 17/935,473, filed on Sep. 26, 2022, titled "MULTI-MODAL SENSOR CALIBRATION FOR IN-CABIN MONITORING SYSTEMS AND APPLICATIONS", and U.S. patent application Ser. No. 17/935,465, filed on Sep. 26, 2022, titled "SENSOR CALIBRATION USING FIDUCIAL MARKERS FOR IN-CABIN MONITORING SYSTEMS AND APPLICATIONS", which are each incorporated herein by reference in its entirety.

This application is related to U.S. patent application Ser. No. 18/349,853, filed on Jul. 10, 2023, titled "IMAGE-BASED THREE-DIMENSIONAL OCCUPANT ASSESSMENT FOR IN-CABIN MONITORING SYSTEMS AND APPLICATIONS", U.S. patent application Ser. No. 18/349,827, filed on Jul. 10, 2023, titled "OCCUPANT EVALUATION USING MULTI-MODAL SENSOR FUSION FOR IN-CABIN MONITORING SYSTEMS AND APPLICATIONS", and U.S. patent application Ser. No. 18/219,969, filed on Jul. 10, 2023, titled "CHILD PRESENCE DETECTION FOR IN-CABIN MONITORING SYSTEMS AND APPLICATIONS", which are each incorporated herein by reference in its entirety.

BACKGROUND

An occupant monitoring system (OMS) may be used within a vehicle cabin to perform real-time assessments of driver and occupant presence, gaze, alertness, or other conditions. For example, an OMS-using data generated or obtained by sensors of the vehicle or machine—may be used to track the direction of a driver's eye gaze, head pose, or blinking (for example to detect drowsiness, fatigue, and/or distraction), for hand position and/or gesture detection, child and/or pet presence detection, and/or in conjunction with the operation of features such as, but not limited to, seat belt reminders, seat heating and/or smart airbag deployment. For example, optical sensors may be used to detect motion occurring within a vehicle interior. Optical image sensor data may also be processed to extract image features to identify and classify the source of motion. Depth-perception sensors may use radio waves, laser light, and/or sound waves, for example, to detect the presence or movements of living beings within a vehicle interior (e.g., humans or pets). Such detections may be used within the context of preventing vehicle burglary and/or preventing children or pets from being left alone in the vehicle unintentionally.

SUMMARY

Embodiments of the present disclosure relate to pose detection model training for predicting three-dimensional pose estimates using two-dimensional image data. Systems and methods are disclosed that provide for technologies for a viewpoint agnostic occupant pose detection model that may predict a three-dimensional pose estimate of a vehicle occupant from an image frame captured by a monocular occupant monitoring system optical image sensor, such as a camera, for example.

In contrast to existing OMS technologies, the systems and methods presented in this disclosure may provide for, among other things, training of an occupant pose detection model to produce a 3D pose estimate of a vehicle occupant from a single monocular image frame and/or a sequence of monocular image frames. The resulting pose detection model is viewpoint agnostic in that the occupant pose detection model may predict a relative scale-normalized 3D pose estimate for a vehicle occupant from an image frame without knowledge of the location, rotation and/or translation of the image sensor that captured the image frame. The occupant pose detection model may be trained using multi-view image sensor training data that includes image frames that capture a pose of a training subject (e.g., a person) within a vehicle interior using multiple synchronized optical image sensors placed around the vehicle interior that produce a set of contemporaneously captured image frames of the training subject from different perspectives (e.g., different viewpoints). The occupant pose detection model may receive the multi-view image sensor training data and produce a set of individual, predicted 3D pose estimates for the training subject from a captured image frame from each of the respective optical image sensors. To train and adjust the occupant pose detection model, a loss feedback may be generated, for example, using a weakly supervised approach. The loss feedback may comprise a combination of a pose alignment loss, a pose depth loss, and/or a ground truth kinematic loss.

BRIEF DESCRIPTION OF THE DRAWINGS

The present systems and methods for pose detection model training for predicting three-dimensional pose estimates using two-dimensional image data are described in detail below with reference to the attached drawing figures, wherein.

DETAILED DESCRIPTION

Figure 1:
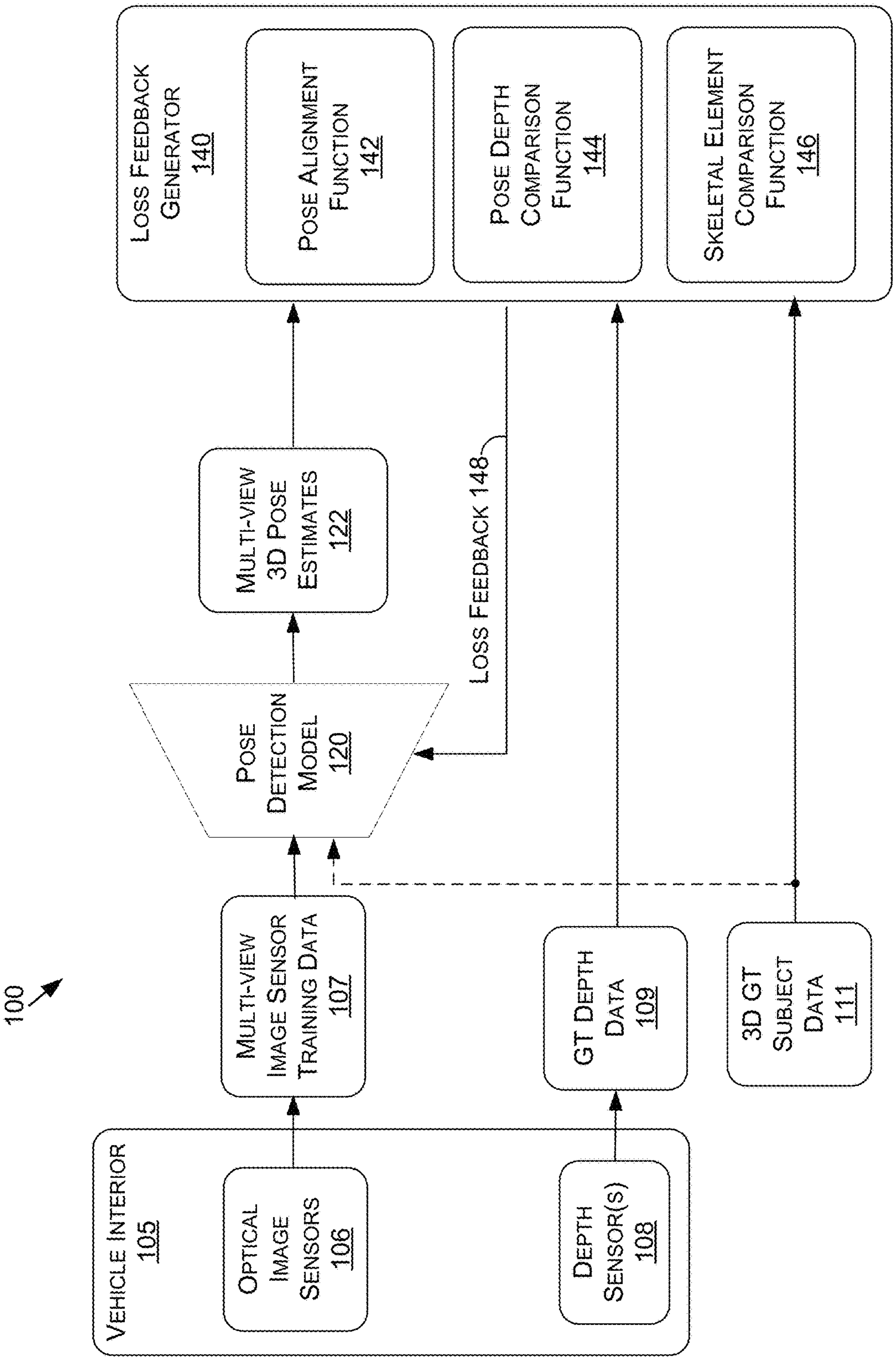
FIG. 1 is a data flow diagram illustrating an example system for pose detection model training, in accordance with some embodiments of the present disclosure.

Systems and methods are disclosed related to pose detection model training for predicting three-dimensional (3D) pose estimates using two-dimensional image data. Although the present disclosure may be described with respect to pose detection models used for an example autonomous or semi-autonomous vehicle or machine 500 (alternatively referred to herein as "vehicle 500" or "ego-machine 500," an example of which is described with respect to FIGS. 5A-5D), this is not intended to be limiting. For example, the systems and methods described herein may be used by, without limitation, non-autonomous vehicles or machines, semi-autonomous vehicles or machines (e.g., in one or more advanced driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater crafts, remotely operated vehicles such as drones, and/or other vehicle types. In addition, although the present disclosure may be described with respect to 3D pose detection and/or estimation (e.g., for vehicle occupant monitoring systems), this is not intended to be limiting, and the systems and methods described herein may be used in augmented reality, virtual reality, mixed reality, robotics, security and surveillance, autonomous or semi-autonomous machine applications, and/or any other technology spaces where 3D pose estimation may be used.

The present disclosure relates to vehicle occupant monitoring technologies. More specifically, the systems and methods presented in this disclosure provide for technologies for a viewpoint agnostic occupant pose detection model that may predict a 3-dimensional pose estimate of a vehicle occupant from an image frame captured by a monocular occupant monitoring system optical image sensor (e.g., a camera). Particularly with respect to detecting the presence, size, and/or 3D body pose of a vehicle occupant, traditional systems have used in-cabin depth sensors, such as RADAR sensors, that may directly generate 3D data corresponding to sensed objects in the vehicle cabin. RADAR sensors are advantageous in that their signals may penetrate through structural elements of the vehicle interior (e.g., car seats) to detect occluded objects not within a line of sight of an optical image sensor. RADAR sensors may produce depth data that can be used to derive size estimates for the size of an occupant (e.g., to differentiate a child from an adult occupant) in three dimensions. However, a RADAR sensor can be expensive to deploy in production vehicles. Moreover, the sensor data from a RADAR sensor is limited in resolution to a degree that limits its ability to produce 3D body pose estimates that precisely capture the position of body limbs (e.g., to perform child presence detection and/or occupant age predictions), and primarily rely on sensed motion to detect the location of objects. Other depth-sensing sensors, such as depth-sensing cameras, also referred to as range cameras, can produce a two-dimensional (2D) range image where pixel values of range image pixels correspond to a distance from the sensor to sensed surfaces in the sensor's field of view. However, depth sensors are also expensive to deploy in production vehicles. Moreover, the accuracy of deriving 3D depth data for an occupant from 2D range images produced by depth sensors is largely a function of how well the depth sensor is calibrated for extrinsic calibration factors (e.g., device rotation and translation) to the vehicle's in-cabin coordinate system. In contrast, optical image sensor data from monocular optical image sensors, such as a camera that captures standard RGB, IR, and/or RGB-IR image frames, may be obtained using relatively inexpensive devices that may already be deployed in the vehicle cabin for other purposes (e.g., driver gaze detection). That said, monocular optical image sensors only generate 2D images that, by themselves, do not convey a sense of 3D position of objects in the capture scene, which makes it difficult to train a machine learning model, such as a deep neural network (DNN), to generate accurate 3D body pose estimates for people captured in the 2D images.

In contrast to traditional occupant monitoring systems, the systems and methods presented in this disclosure may be used, among other things, for training an occupant pose detection model (e.g., implemented using a convolutional neural network (CNN), a deep neural network (DNN), and/or other neural network architecture) to produce a 3D pose estimate of a vehicle occupant from a single monocular image frame and/or a sequence of monocular image frames. Furthermore, the resulting pose detection model is viewpoint agnostic, meaning that the occupant pose detection model may predict a relative scale-normalized 3D pose estimate for a vehicle occupant from an image frame without knowledge of the location, rotation and/or translation of the image sensor that captured the image frame. These embodiments may include building ground truth for training the occupant pose detection model to produce the 3D pose estimates without the need to have training subjects wear bulky motion capture suits, such as suits that comprise wearable sensor devices that record the body movements of the wearer.

In some embodiments, the occupant pose detection model may be trained using multi-view image sensor training data that includes image frames that capture a pose of a training subject (e.g., a vehicle occupant) within a vehicle interior using multiple synchronized optical image sensors placed around the vehicle interior that produce a set of contemporaneously captured image frames of the training subject from different perspectives (e.g., different viewpoints). The occupant pose detection model may receive the multi-view image sensor training data and produce a set of individual, predicted 3D pose estimates for the training subject from a captured image frame from each of the respective optical image sensors. The 3D pose estimates may indicate 3D coordinates for one or more kinematic elements of the training subject, such as at least one body joint and/or at least one body limb. In some embodiments, in order to generalize the training of the occupant pose detection model, a diverse set of training subjects may be used, including adults and children of various sizes. To train and adjust the occupant pose detection model to improve the accuracy of predicted 3D pose estimates, a loss feedback may be generated (e.g., by a loss feedback generator) using a weakly supervised approach. As discussed in greater detail below, the loss feedback used to reward or penalize the occupant pose detection model based on the accuracy of the set of individual, predicted 3D pose estimates may comprise a combination of a pose alignment loss, a pose depth loss, and/or a ground truth kinematic loss.

In some embodiments, the occupant pose detection model disclosed herein may produce 3D pose estimates of a vehicle occupant that may be used as inputs to other systems and functions that further predict other characteristics regarding a vehicle occupant such as a size, weight, and/or age of the vehicle occupant. The occupant pose detection model may thus be used in conjunction with child presence detection system designed to protect against children and/or pets from being left alone in a vehicle by accident. The occupant pose detection model may be used in conjunction with other vehicle safety features. For example, in some embodiments, airbag deployment may be controlled based on a 3D pose estimate of a vehicle occupant. For example, based on the 3D pose estimate, an airbag deployment system may determine that the vehicle occupant is out of position so that an airbag should not be deployed. In some embodiments, an airbag deployment system may control an airbag deployment pressure based on the 3D pose estimate of a vehicle occupant and/or an estimated size or age of the vehicle occupant derived at least in part from the 3D pose estimate.

With respect to the pose alignment loss, the multiple optical image sensors used to capture the multi-view image sensor training data may be arranged at different positions within the vehicle interior. The multiple image sensors may be calibrated together using a calibration procedure that uses multiple calibration targets placed within the vehicle interior. For example, the calibration targets may include a structural substrate that includes one or more fiducial point markers and/or an array of visual fiducial system patterns (e.g., ARtags, AprilTags, QR codes, etc.) that facilitate computing precise 3D position, orientation, and/or identify the fiducial markers. The number of calibration targets in the system of calibration targets may vary as a function of the size of the interior space, but generally should be distributed to span the area to be monitored, have a diversity of alignments (e.g., arranged to align with at least two distinct intersecting planes within the interior space). For a non-limiting example, for a typical vehicle cabin of a consumer automobile, the system of calibration targets may include five calibration targets with a calibration target positioned on the driver's seat cushion, a calibration target positioned on the driver's seat back cushion, a calibration target positioned on the front passenger's seat cushion, a calibration target positioned on the front passenger's seat back cushion, and a calibration target positioned on the center console between the driver's seat and the front passengers seat. Furthermore, the calibration targets may be placed within the vehicle interior such that each of the multiple image sensors has within its field of view at least two of the calibration targets. Additional details and examples for performing calibrations within a vehicle interior using calibration targets are described in U.S. patent application Ser. No. 17/935,473, filed on Sep. 26, 2022, titled "Multi-Modal Sensor Calibration For In-Cabin Monitoring Systems And Applications," which is incorporated herein by reference in its entirety.

Extrinsic and intrinsic parameters of an optical image sensor both play a part in how features of a scene within the 3D coordinate space of the vehicle cabin (e.g., the cabin coordinate system) are mapped to a captured 2D image frame. Intrinsic parameters may refer to factors that describe optical image sensor device optics, such as optical center (also known as the principal point), focal length, skew coefficient, and/or field of view. Intrinsic parameters for a sensor are relatively static and may be determined based on fabrication specifications and/or factory calibrations. Extrinsic parameters may refer to factors that describe the physical orientation of the optical image sensor device, such as rotation and translation (also referred to as roll and tilt). The extrinsic parameters of both the depth-perception sensors and optical image sensors are largely functions of how the respective sensors are mounted and oriented within the space of the vehicle cabin. Each of the multiple image sensors used for capturing the multi-view image sensor training data may be calibrated to a common coordinate reference frame by deriving a rotation-translation (RT) transform that accounts for the rotation and translation of an image sensor as-installed so that the 2D coordinate space of a captured image frame may be mapped, for example, to a 3D cabin coordinate system of the vehicle.

In some embodiments, the location and orientation of the optical image sensors used to capture the multi-view image sensor training data may be related to vehicle geometry specifications (e.g., from a Computer Assisted Drawing (CAD) model of the vehicle interior) via a reference target in the vehicle that is at a reproducible location and a location that can be associated with the vehicle geometry specifications. For example, an image frame capturing a plurality of fiducial points from surfaces within the vehicle cabin may be generated from captured image sensor data. Invariant 3D cabin coordinates (e.g., x, y, z) associated with each of those fiducial points may be pre-established. For example, 3D cabin coordinates for a fiducial point may be obtained from vehicle manufacturer design specifications, such as coordinates of the fiducial points as indicated by CAD models, or similar models, used for manufacturing the vehicle. In some embodiments, each fiducial point includes an encoded identifier (ID) readable by the image sensor. During calibration, a calibration algorithm may read the fiducial point ID for a fiducial point using the image sensor and obtain from a memory the 3D cabin coordinates corresponding (x, y, z) to that fiducial point ID. To detect the location of fiducial markers in the 2D coordinate space (u, v) of the captured image frame, processing of the image frame may be performed using one or more computer vision algorithms and/or machine learning models. For each fiducial point, the pair of corresponding 2D coordinates (u, v) and 3D coordinates (x, y, z) may be used to define a respective coordinate pair. The set of coordinate pairs that comprises the respective coordinate pair for each of the fiducial points identified from the captured image frame may then be processed by a pose computation algorithm. In some embodiments, the pose computation algorithm computes an optimized translation-rotation matrix corresponding to the extrinsic pose of the image sensor. The OpenCV algorithm solvePnP is one example of a pose computation algorithm that may be used to estimate rotation and translation vectors. These rotation and translation vectors represent a transform between a 3D point expressed in the cabin coordinate frame and a 2D point expressed in the image coordinate frame. A resulting optimal RT matrix derived from the rotation and translation vectors thus represents an estimate of the pose of the image sensor with respect to the vehicle's cabin coordinate system. The computed optimal RT matrix may be saved to memory as an extrinsic calibration parameter corresponding to that image sensor. A feature appearing at a 2D pixel coordinate (u, v) in the local 2D coordinate system of one of the training image sensors may thus be mapped to a 2D pixel coordinate (u, v) in the local 2D coordinate system of any of the other training image sensors using their respective extrinsic calibration parameters, and/or translated to a 3D point expressed in the cabin coordinate frame. Additional examples and details regarding calibration of image sensors is described in U.S. patent application Ser. No. 17/935,465, filed on Sep. 26, 2022, titled "Sensor Calibration Using Fiducial Markers for In-Cabin Monitoring Systems and Applications," which is incorporated herein by reference in its entirety.

The extrinsic calibration parameters for the multiple optical image sensors may therefore be used to project individual predicted 3D pose estimates generated by the occupant pose detection model into a common 3D coordinate reference frame, and determine how well predicted kinematic elements (e.g., joints between body limbs) of the training subject from the different 3D pose estimates are aligned in the common 3D coordinate reference frame. As an example, each of the individual, predicted 3D pose estimates may include a 3D pose estimate that predicts coordinates for kinematic elements such as a wrist, elbow, shoulder, and neck of a training subject seated in the vehicle cabin. This set of predicted 3D pose estimates is generated from synchronously captured image data from the different optical image sensors (each having different viewpoints of the training subject) so that the several predicted 3D pose estimates, if accurately predicted, should closely align when superimposed on each other (e.g., within the tolerances of the sensor calibrations). That is, the predicted 3D coordinates of the wrist, elbow, shoulder, and/or neck kinematic elements from each of the set of predicted 3D pose estimates, when projected into the common 3D coordinate reference frame, should align with each other.

The degree to which the predicted 3D coordinates of these kinematic elements do (or do not) align between the individual predicted 3D pose estimates may be computed using an alignment algorithm to derive an alignment loss. The alignment loss may be fed back as a component of the loss feedback to adjust the pose detection model. The alignment loss adjusts the pose detection model by rewarding and/or penalizing the model based on how well the detected kinematic elements (e.g., joints and limbs) of the training subject align in the multiple 3D pose estimates. The greater the degree of misalignment of kinematic elements between the 3D pose estimates, the greater the alignment loss. In this way, based on the 2D multi-view image sensor data, the pose detection model is able to learn to predict a 3D pose from 2D images without a need for 3D pose ground truth training data. In some embodiments, the initial training of the occupant pose detection model may be initially constrained to 2D pose training so that it may begin learning to recognize poses comprising body limbs and joints. Such initial pose training, in some embodiments, may be performed using, for example, pre-labeled 2D pose data as ground truth, where the 2D coordinates of body joints (e.g., wrist, elbow, shoulders, and/or other body joints) within a training image are known and the occupant pose detection model is trained to detect and predict the 2D coordinates for those body joints.

With respect to the pose depth loss, in some embodiments, this loss may computed using ground truth depth data derived from, for example, a depth sensor that produces a 2D range image of the training subject in the vehicle interior as the multi-view image sensor data is captured. The 2D range image may comprise an image frame of pixels where the pixel values of the pixels correspond to a distance from the depth sensor to the training subject and other elements in the depth sensor's field of view. Moreover, the depth sensor may also be calibrated to the same common coordinate reference frame as the image sensors that capture the multi-view image sensor data. That is, an RT transform may be derived for the depth sensor to use as an extrinsic calibration parameter that accounts for the rotation and translation of the sensor as-installed in the cabin, in the same manner as for the multi-view image sensors. Accordingly, a feature appearing at a 2D pixel coordinate (u, v) in the local 2D coordinate system of a 2D range image captured by the depth sensor may be mapped to a 2D pixel coordinate (u, v) in the local 2D coordinate system of any of the image sensors using their respective extrinsic calibration parameters, and/or translated to 3D coordinates (x, y, z) expressed in the cabin coordinate frame.

In some embodiments, the extrinsic calibration parameters are used to map the depth data into the local 2D coordinate system of the individual pose estimates derived from multi-view image frame data captured by the multiple image sensors. In other words, for a given image frame captured by one of the multiple image sensors, the depth data (e.g., the pixel values of the range image) may be correlated with the pixels of an image frame captured by that image sensor and/or mapped to the common coordinate reference frame. As such, a sense of depth ground truth can be established for each of the features appearing in each of the frames of multi-view image frame data, including establishing a depth for pixels in those images that corresponds to at least one kinematic element (e.g., body joint(s) and/or limb(s)). As an example, in the example above, the occupant pose detection model predicted a set of 3D pose estimates for kinematic elements including the wrist, elbow, shoulder, and/or neck of the training subject. By mapping the 2D range image from the depth sensor to the field of view of an image sensor, a distance value can be assigned to pixels of an image frame corresponding to kinematic elements such as the wrist, elbow, and/or shoulder. This distance can be compared to a distance from the image sensor to the wrist, elbow, and/or shoulder determined using 3D coordinates from the 3D pose estimate derived from that image frame. The difference between the range image-based distance and the 3D pose estimate-based distance for each kinematic element at least in part represents an error in the 3D pose estimate that may be used as feedback for training the occupant pose detection model. In some embodiments, the degree to which the range image-derived distance and pose estimate-based distances agree may be computed using a depth comparison algorithm to derive a pose depth loss which may be fed back as another component of the loss feedback to adjust the pose detection model.

While the 2D image frames capture a horizontal and vertical 2D pixel coordinate (u, v) of a kinematic element, the range value to that kinematic element is not known from the 2D image frame. In some embodiments, the occupant pose detection model may constrain a range of 3D pose coordinates that may be validly predicted for that kinematic element using particle transport simulation, such as a ray tracing based on a ray that extends from the image sensor through a 2D pixel coordinate (u, v) of the kinematic element. The pose depth loss represents a ground truth-based constraint that may be used to adjust the occupant pose detection model to better predict where along that ray the kinematic element is located. Moreover, as the occupant pose detection model better predicts the depths of a complete set of kinematic elements appearing in a particular image view (e.g., the wrist, elbow, shoulder and neck), and further does so for all of the image views represented by the set of individual, predicted 3D pose estimates, the degree of alignment of kinematic elements between the individual predicted 3D pose may improve, resulting in an improvement (e.g., a reduction) in the alignment loss component of the loss feedback.

With respect to the ground truth kinematic loss, in some embodiments, this loss may be computed using 3D ground truth (GT) subject data captured from the training subject. For example, image frames (such as optical image frames and/or range image frames) representing the training subject may be captured from different viewpoints, and ground truth values for various body limb lengths (e.g., distances between body joints) may be computed from the image frames. The resulting set of body limb lengths may define a set of kinematic ground truth data for that training subject that may be used to compute the ground truth kinematic loss for training the occupant pose detection model. For example, with respect to the wrist, elbow, shoulder, and neck of a training subject, the kinematic ground truth data may include a ground truth limb length of the training subject's lower arm between the wrist and elbow, a ground truth limb length of the training subject's upper arm between the elbow and shoulder, and/or a ground truth limb length of the training subject's extended arm between the wrist and shoulder. When the occupant pose detection model generates the set of individual, predicted 3D pose estimates from the multi-view image sensor data during training, the distances between predicted 3D coordinates of kinematic elements from the predicted 3D pose estimates may be compared to the ground truth limb lengths. Because the training subject's limb lengths are fixed and invariant, a distance between 3D coordinates from a 3D pose estimate for the training subject's wrist and elbow should agree with (e.g., approximately equate to within an acceptance criteria) the ground truth limb length of the training subject's lower arm. The same should be true for the other kinematic elements appearing in the multi-view sensor data of the training subject in the vehicle interior. As such, in some embodiments, distances between body joints for one or more limbs of the training subject—as represented in the 3D pose estimates generated by the occupant pose detection model—may be compared to ground truth limb lengths for the corresponding limb of the training subject and a ground truth kinematic loss computed. The difference between the ground truth limb lengths and the 3D pose estimate-based limb lengths at least in part represent an error in the 3D pose estimate that may be used as feedback for training the occupant pose detection model. In some embodiments, the degree to which the ground truth limb lengths and the 3D pose estimate-based limb lengths agree may be computed using a kinematic comparison algorithm to derive a ground truth kinematic loss which may be fed back as another component of the loss feedback to adjust the pose detection model. The ground truth kinematic loss represents a ground truth-based further constraint to adjust the occupant pose detection model to better predict the 3D position of at least one body joint, given the known distances that fixed limb lengths for a training subject impose between body joints.

The 3D ground truth subject data for a training subject may be captured by taking partial and/or full length body images from different viewpoints around the training subject. In some embodiments, multiple optical image sensors and/or depth image sensors may be positioned around a training subject staging point to form a 3D ground truth subject data collection framework. For example, the multiple image sensors and/or depth image sensors may be arranged around a training subject staging point such that their fields of view collectively capture the training subject from 360 degrees. As an example, in some embodiments, the 3D ground truth subject data collection framework may comprise four sensor stations, each comprising an image sensor and/or a depth image camera placed 90 degrees apart around a perimeter at a known distance from the training subject staging point. In other embodiments, a fewer or greater number of sensor stations may be used at different positions around the training subject staging point. Using the 3D ground truth subject data collection framework, a surround view of the training subject may be obtained with minimal occlusions for estimating 3D ground truth kinematic elements and/or 3D ground truth shape elements to provide more accurate ground truth for generating the loss feedback for optimizing the pose detection model. An optical image sensor and/or a depth image camera of each sensor station may be positioned at known elevations above a plane of the training subject staging point. Moreover, the image sensor and/or a depth image camera may be calibrated to a common coordinate reference frame (e.g., a defined reference frame for the 3D ground truth subject data collection framework). In a similar way as that discussed above, sensors of the 3D ground truth subject data collection framework may be calibrated to a common coordinate reference frame by deriving a rotation-translation (RT) transform that accounts for the rotation and translation of the sensors as-installed and their known relative locations around the training subject staging point. As such, a feature appearing at a 2D pixel coordinate in the local 2D coordinate system of one of the sensors may be mapped to a 2D pixel coordinate in the local 2D coordinate system of any of the sensors using their respective extrinsic calibration parameters, and/or translated to a 3D point expressed in the common coordinate reference frame.

In some embodiments, to generate the 3D ground truth subject data, the training subject may be positioned at the training subject staging point and proceed through a series of poses as the sensors synchronously capture concurrent images of the training subject from the different viewpoints (e.g., 360 degrees) around the training subject. As discussed herein, the sequence of poses assumed by the training subject may be designed to emphasize various positions and ranges of motion associated with each of the body joints and limbs of interest.

A collected set of kinematic element data may be evaluated, for example, by a pose detection algorithm, to detect the kinematic elements from each range image. The set of kinematic element data may be optimized to estimate distances between joints and correlate those distances into the limb lengths included in the 3D ground truth subject data used to compute the ground truth kinematic loss. For example, in some embodiments, the set of kinematic element data may be optimized based on aligning predicted 3D positions of one or more kinematic elements from a given pose captured at different viewpoints. In some embodiments, a 3D pose and/or size estimate may be computed for one or more of the poses assumed by the training subject, and the image frames capturing those poses may be labeled based on the 3D pose estimates. The labeled image frames may be used for various purposes, such as but not limited to, ground truth training data for training machine learning models. For example, in some embodiments, the occupant pose detection model may be further trained based on labeled 3D pose training data to more generally recognize pose variations. For example, 3D pose training data comprising a set of ground truth labeled images of a given pose captured at different viewpoints may be given as input to the occupant pose detection model and the model attempts to predict the 3D pose for one or more kinematic elements indicated by the labels. The loss feedback in such an embodiment may comprise the alignment loss computed from the 3D pose estimate predicted 3D coordinates of the one or more kinematic elements for the different viewpoints. In some embodiments, a combination of optical image frames and range image frames may be captured to produce the 3D ground truth subject data to produce a complete 360 degree reconstruction of the training subject. For example, range image frames may be used to generate data to derive the ground truth skeleton elements and/or a 3D shape estimation, and optical image frames may be used to produce a 3D mesh around the skeleton elements to provide more accurate ground truth subject data. In addition to the training of the pose detection model as discussed herein, the generated 3D ground truth data may be used as ground truth data for supervised and/or weakly supervised multi-view training for several features such as, but not limited to, 3D pose estimation, 3D shape estimation, monocular depth estimation, and/or activity recognition, for example.

The various sensor data processing, pose estimation, size estimation, and/or other models, functions, and algorithms disclosed herein may be executed at least in part on one or more graphics processing units that may operate in conjunction with software executed on a central processing unit coupled to a memory. The graphics processing units may be programmed to execute kernels to implement one or more aspects of functions for occupant monitoring described herein. In some embodiments, the execution of some algorithms may be distributed and performed by a combination of processors and cloud computing resources.

With reference to FIG. 1, FIG. 1 is an example data flow diagram for a system 100 for pose detection model training, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by one or more processing units executing instructions stored in memory. In some embodiments, the systems, methods, and processes described herein may be executed using similar components, features, and/or functionality to those of example autonomous vehicle 500 of FIGS. 5A-5D, example computing device 600 of FIG. 6, and/or example data center 700 of FIG. 7.

As shown in FIG. 1, the pose detection model training system 100 may include at least one pose detection model 120 coupled to a loss feedback generator 140. The pose detection model 120 may comprise a machine learning model, such as a model implemented using a convolutional neural network (CNN), a deep neural network (DNN), and/or other neural network architecture. During a training process, the pose detection model 120 may input multi-view image sensor training data 107 captured by a plurality of synchronized optical image sensors 106, which may be placed around the vehicle interior 105. The multi-view image sensor training data 107 may therefore comprise a set of contemporaneously captured image frames of a training subject (e.g., a vehicle occupant) from different viewpoints or perspectives. Using the multi-view image sensor training data 107, the pose detection model 120 generates a set of multi-view 3D pose estimates 122 for the pose of the vehicle occupant as captured by the image frames of the multi-view image sensor training data 107. The loss feedback generator 140 may produce a loss feedback 148 that is used to adjust the pose detection model 120 during training as a function of the accuracy of a set of multi-view 3D pose estimates 122 predicted by the pose detection model 120 using 2D multi-view image sensor data 107.

Figure 2A:
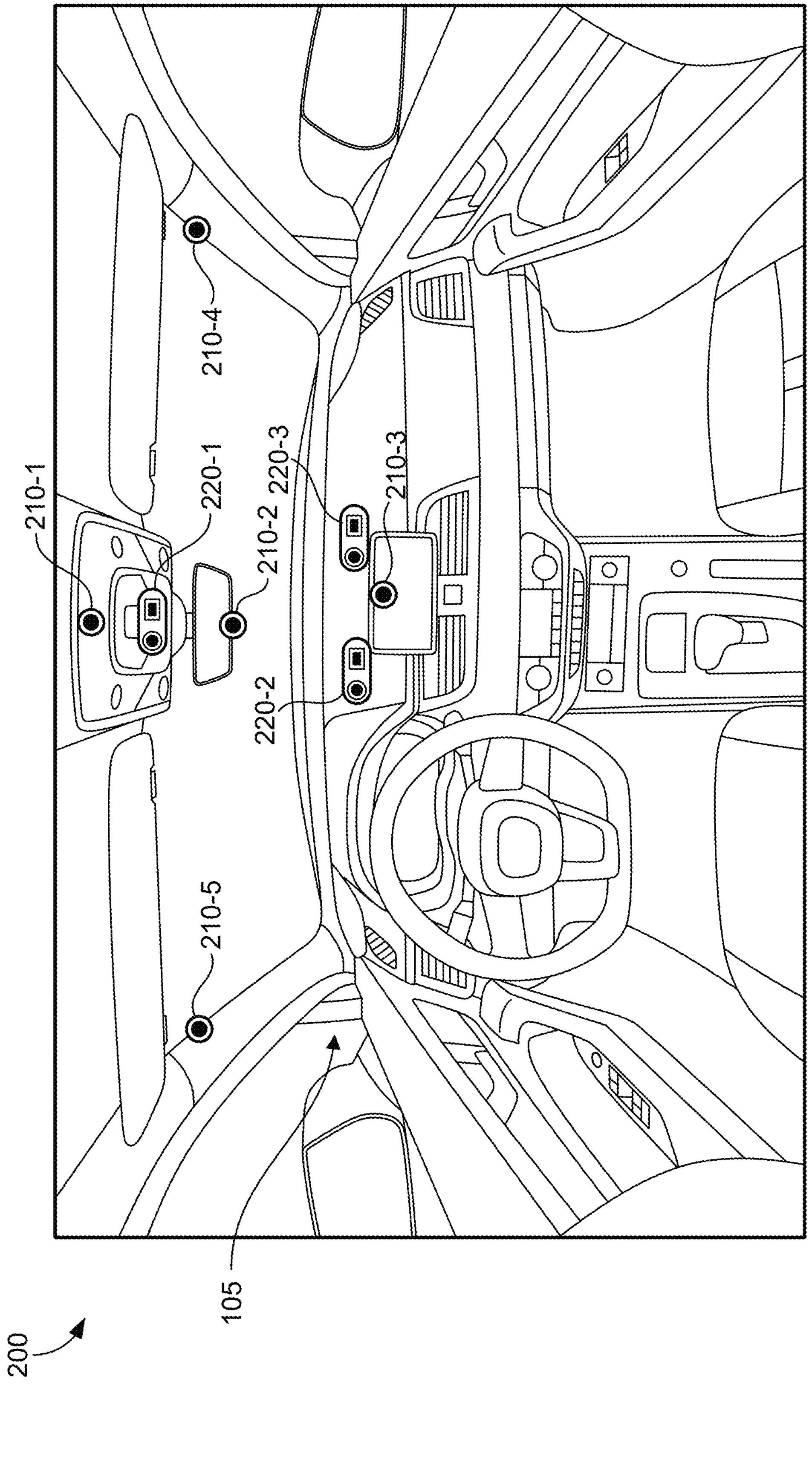
FIG. 2A is a diagram illustrating placement of optical image sensors and depth sensors for pose detection model training, in accordance with some embodiments of the present disclosure.

For example, referring to FIG. 2A, FIG. 2A at 200 illustrates a vehicle interior 105 (e.g., a vehicle cabin) and further depicts example locations showing where optical image sensors 106 may be placed. In this example, the optical image sensors 106 include an optical image sensor mounted to an overhead console (shown at 210-1), an optical image sensor mounted to a rearview mirror (shown at 210-2), an optical image sensor mounted to a lower console (shown at 210-3), an optical image sensor mounted to a right structural pillar (shown at 210-4), and an optical image sensor mounted to a left structural pillar (shown at 210-5). FIG. 2A also illustrates an example location of a depth sensor 108, which may be located within the vehicle interior 105 as shown on the overhead console at 220-1, or positioned to view the driver and one or more passengers, as shown at 220-2 and 220-3. It should be understood that the number and location of the optical image and depth sensors as depicted in FIG. 2A are for example purposes only and that other embodiments may use different numbers of optical image sensors positioned at different locations. Moreover, in some embodiments, optical image sensors 106 and depth sensors 108 may be positioned to cover viewpoints (e.g., fields of view) of other seating positions (e.g., second row seating, third row seating, and so forth).

Figure 2B:
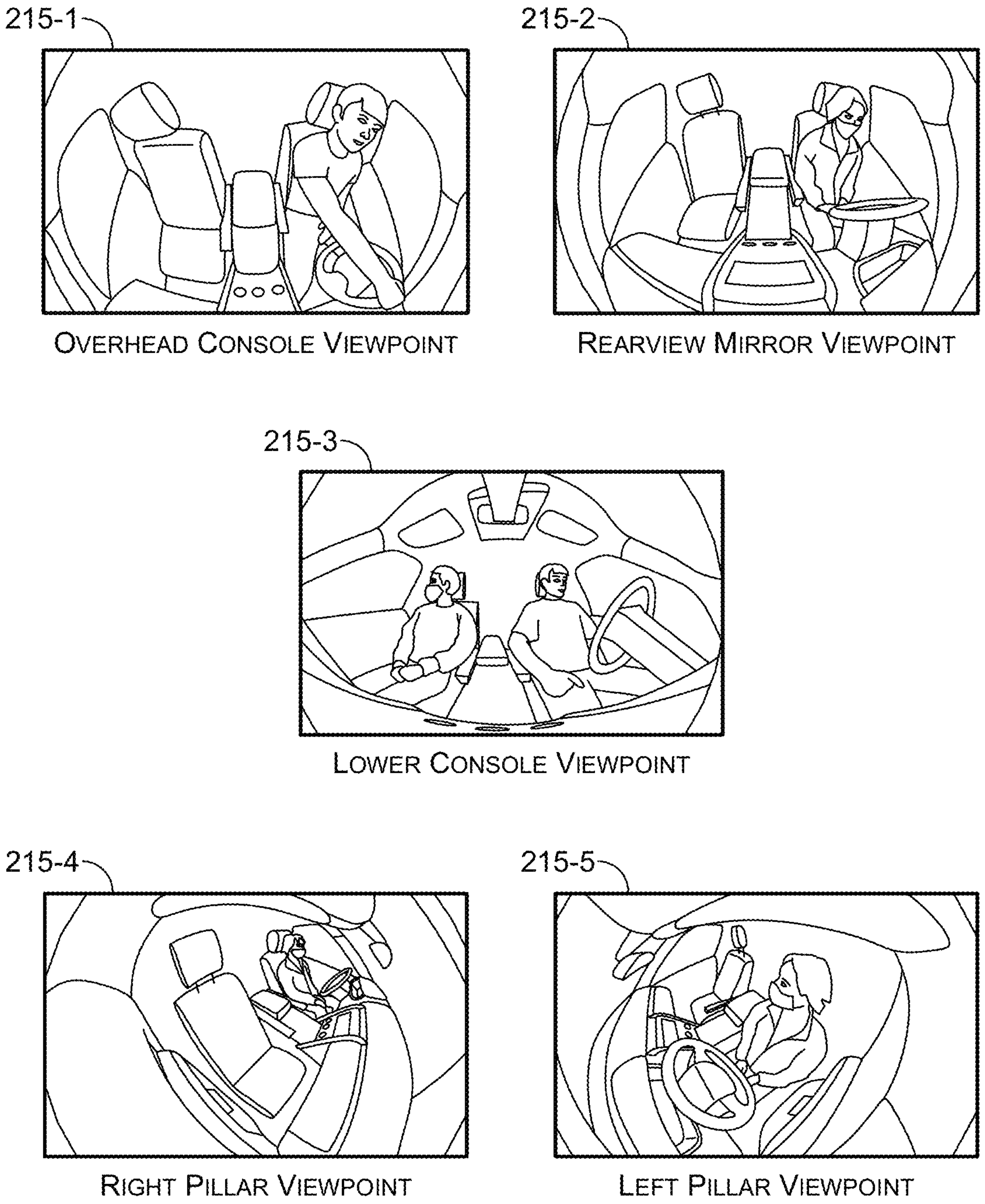
FIG. 2B is a diagram illustrating fields of view of a vehicle interior as may be observed from the particular viewpoints of multiple optical image sensors.

For purposes of example, FIG. 2B illustrates fields of view of the vehicle interior, as may be observed from the particular viewpoints of the optical image sensors depicted in FIG. 2A. For example, image 215-1 depicts an image frame of a viewpoint captured by the optical image sensor 210-1 mounted to an overhead console, image 215-2 depicts an image frame of a viewpoint captured by the optical image sensor 210-2 mounted to a review mirror, image 215-3 depicts an image frame of a viewpoint captured by the optical image sensor 210-3 mounted to a lower console, image 215-4 depicts an image frame of a viewpoint captured by the optical image sensor 210-4 mounted to the cabin right side front pillar, and image 215-5 depicts an image frame of a viewpoint captured by the optical image sensor 210-5 mounted to the cabin left side front pillar.

The multiple optical image sensors 106 used to capture the multi-view image sensor training data 107 may thus synchronously capture 2D representations of the pose of a vehicle occupant from a respective different view point. Each of the multiple optical image sensors 106 and/or depth sensor(s) 108 may be calibrated to a common coordinate reference frame by accounting for extrinsic parameters that represent how the respective sensors are mounted and oriented within the space of the vehicle cabin. For example, an extrinsic calibration parameter may be computed for each of the optical image sensors 106, such as an RT transform. The RT transform accounts for the rotation and translation of an image sensor 106 as-installed so that the 2D coordinate space of a captured image frame may be mapped, for example, to a 3D cabin coordinate system of the vehicle. A feature appearing at a 2D pixel coordinate (u, v) in the local 2D coordinate system of one of the image sensors 106 may thus be mapped to a 2D pixel coordinate (u, v) in the local 2D coordinate system of any of the other image sensors 106 using their respective extrinsic calibration parameters, and/or translated to a 3D point expressed in the cabin coordinate frame. In some embodiments, the extrinsic calibration parameters may be applied, for example, to one or more of the multi-view 3D pose estimates 122 predicted by the pose detection model 120 to map the plurality of 3D pose estimates to a common 3D coordinate reference frame.

In some embodiments, training of the pose detection model 120 to generate the multi-view 3D pose estimates 122 includes a process of iteratively adjusting the occupant pose detection model 120 using the loss feedback 148 generated by the loss feedback generator 140 to improve the accuracy of the predicted 3D pose estimates 122. The loss feedback 148 may include one or more different loss components such as, but not limited to, a combination of a pose alignment loss component, a pose depth loss component, and/or a ground truth kinematic loss component.

Referring back to FIG. 1, the loss feedback generator 140 may comprise a pose alignment function 142 that generates the pose alignment loss component of the loss feedback 148. In some embodiments, the pose alignment function 142 may apply the extrinsic calibration parameters for the multiple optical image sensors 106 to project individual, predicted 3D pose estimates of the set of multi-view 3D pose estimates 122 into a common 3D coordinate reference frame, and determine how well predicted kinematic elements (e.g., joints between body limbs) represented by the different 3D pose estimates are aligned in the common 3D coordinate reference frame. As an example, each of the individual, predicted 3D pose estimates may include a 3D pose estimate that predicts coordinates for kinematic elements such as a wrist, elbow, shoulder, and/or neck of a training subject occupant in the vehicle cabin. The predicted 3D coordinates of the wrist, elbow, shoulder, and/or neck kinematic elements from each of the set of predicted 3D pose estimates, when projected into the common 3D coordinate reference frame using the extrinsic calibration parameters, should align with each other. In some embodiments, the pose alignment function 142 determines how well kinematic elements from the individual 3D pose estimates align in the common 3D coordinate reference frame by applying an alignment algorithm that computes the pose alignment loss component of the loss feedback 148. The pose alignment loss component of the loss feedback 148 thus indicates a degree to which the predicted 3D coordinates of these kinematic elements align between the individual, predicted 3D pose estimates.

In some embodiments, the loss feedback generator may comprise a pose depth comparison function 144 that generates the pose depth loss component of the loss feedback 148. The pose depth loss may be computed using ground truth depth data 109 derived from one or more depth sensors 108. For example, the ground truth depth data 109 may comprise, or otherwise represent, a 2D range image of the occupant in the vehicle interior as the multi-view image sensor training data 107 is captured. In some embodiments, the ground truth depth data 109 may comprise a 2D range image that includes a frame of pixels where the pixel values of the pixels correspond to a distance from a depth sensor 108 to the occupant and other elements in the field of view of the depth sensor 108. The depth sensor 108 may be calibrated to the same common coordinate reference frame as the optical image sensors 106 that capture the multi-view image sensor training data 107. That is, an RT transform may be derived for a depth sensor 108 to use as an extrinsic calibration parameter that accounts for the rotation and translation of the sensor as-installed in the cabin, in the same manner as for the multi-view image sensors 106. Accordingly, a feature appearing at a 2D pixel coordinate (u, v) in the local 2D coordinate system of a 2D range image captured by a depth sensor 108 may be mapped to a 2D pixel coordinate (u, v) in the local 2D coordinate system of any of the image sensors 106 using their respective extrinsic calibration parameters, and/or translated to 3D coordinates (x, y, z) expressed in the cabin coordinate frame.

In some embodiments, the extrinsic calibration parameters are used to map the depth data into the coordinate system of the individual pose estimates 122 predicted by the pose detection model 120. For example, in some embodiments, the pose depth comparison function 144 may apply the extrinsic calibration parameters of the depth sensor 108 and/or of the optical image sensors 106 to correlate pixel values of a depth data range image with the pixels of an image frame captured by that image sensor, and/or map the depth data represented by the pixel values to the common coordinate reference frame (e.g., the common coordinate reference frame used by the pose alignment function to compute alignment loss). In this way, a sense of ground truth depth can be established for each of the features appearing in each of the frames of multi-view image frame data and/or the 3D pose estimates, including establishing a depth for pixels in those images that correspond to kinematic elements (e.g., body joints and limbs). By mapping the 2D range image from the depth sensor to the field of view of an image sensor, a distance value can be assigned to pixels of an image frame corresponding to kinematic elements such as a wrist, elbow, and/or shoulder that appear in the 3D pose estimates 122. A distance to a kinematic element determined from the GT depth data 109 can be compared to a distance from the image sensor to that kinematic element derived using the 3D coordinates from the 3D pose estimates 122. The pose depth comparison function computes difference(s) between the GT depth data 109 based distance and the 3D pose estimate 122 based distance, to estimate an error in the 3D pose estimate that may be incorporated into the loss feedback 148 for training the pose detection model 120. In some embodiments, the occupant pose detection model 120 learns during training to constrain a range of 3D pose coordinates that may be validly predicted for detected kinematic elements based on the pose depth loss component of the loss feedback 148. As the occupant pose detection model 120 iteratively learns to better predict the depths of a complete set of kinematic elements appearing in the multi-view image sensor training data 107 (e.g., the wrist, elbow, shoulder, and neck), the degree of alignment of kinematic elements between the individual, predicted 3D pose estimates 122 may improve, resulting in an improvement (e.g., a reduction) in the alignment loss component of the loss feedback 148.

In some embodiments, the loss feedback generator 140 may comprise a kinematic element comparison function 146 that generates a ground truth kinematic loss component of the loss feedback 148. The ground truth kinematic loss component may be computed using 3D ground truth subject data 111 captured for a training subject that appears as an occupant in the multi-view image sensor training data 107. In some embodiments, the 3D ground truth subject data 111 may be generated using a 3D ground truth subject data collection framework 300 as discussed below with respect to FIG. 3A. In some embodiments, the 3D ground truth subject data 111 may comprise image frames (e.g., optical image frames and/or range image frames) of the training subject synchronously captured from different viewpoints as the training subject assumes a series of predefined poses. From the image frames, a kinematic element data generator may predict ground truth values for various body limb lengths (e.g., distances between body joints) using the image frames. The resulting set of body limb lengths may define a set of kinematic ground truth data for that training subject that may be used to compute the ground truth kinematic loss for training the occupant pose detection model 120.

The occupant pose detection model 120 may generate a set of individual, predicted 3D pose estimates 122 from the multi-view image sensor training data 107 that include a training subject represented by the 3D ground truth subject data 111 as a vehicle occupant. The kinematic element comparison function 146 may use the predicted 3D pose estimates 122 to determine limb lengths (e.g., distances between predicted 3D coordinates of kinematic elements) of a training subsect occupying the vehicle and generate a comparison of those limb lengths to limb lengths of corresponding kinematic elements for that training subject from the 3D ground truth subject data 111. Because the training subject's limb lengths are fixed and invariant, limb lengths derived from the 3D pose estimates 122 should match (e.g., approximately equate to within an acceptance criteria) the limb lengths defined by the 3D ground truth subject data 111. The kinematic element comparison function 146 may detect differences between the ground truth limb lengths and the 3D pose estimate-based limb lengths, and based on those differences compute the ground truth kinematic loss component of the loss feedback 148. In some embodiments, the degree to which the ground truth limb lengths and the 3D pose estimate-based limb lengths agree may be computed using a 3D object matching algorithm to derive the ground truth kinematic loss. In some embodiments, the occupant pose detection model 120 learns during training to constrain a range of 3D pose coordinates that may be validly predicted for detected kinematic elements based on the ground truth kinematic loss component of the loss feedback 148.

Although the pose alignment function 142, pose depth loss computed by pose depth comparison function 144, and kinematic element comparison function 146 of the loss feedback generator 140 are illustrated in FIG. 1 as separate functions, in some embodiments the functions performed by these elements as described herein may be at least in part integrated together.

FIGS. 3A, 3B, 3C, and 3D illustrate an example 3D ground truth subject data collection framework 300 that may be used to generate the 3D ground truth subject data 111, in accordance with some embodiments. In some embodiments, the 3D ground truth subject data 111 for a training subject may be captured using the 3D ground truth subject data collection framework 300 by taking partial and/or full length body images from different viewpoints around the training subject. Using the 3D ground truth subject data collection framework 300, a surround view of a training subject 310 may be obtained with minimal occlusions for estimating 3D ground truth subject data 110 (e.g., including 3D ground truth kinematic elements and/or 3D ground truth shape elements) to provide more accurate ground truth for generating the loss feedback 148 for optimizing the pose detection model 130.

Figure 3A:
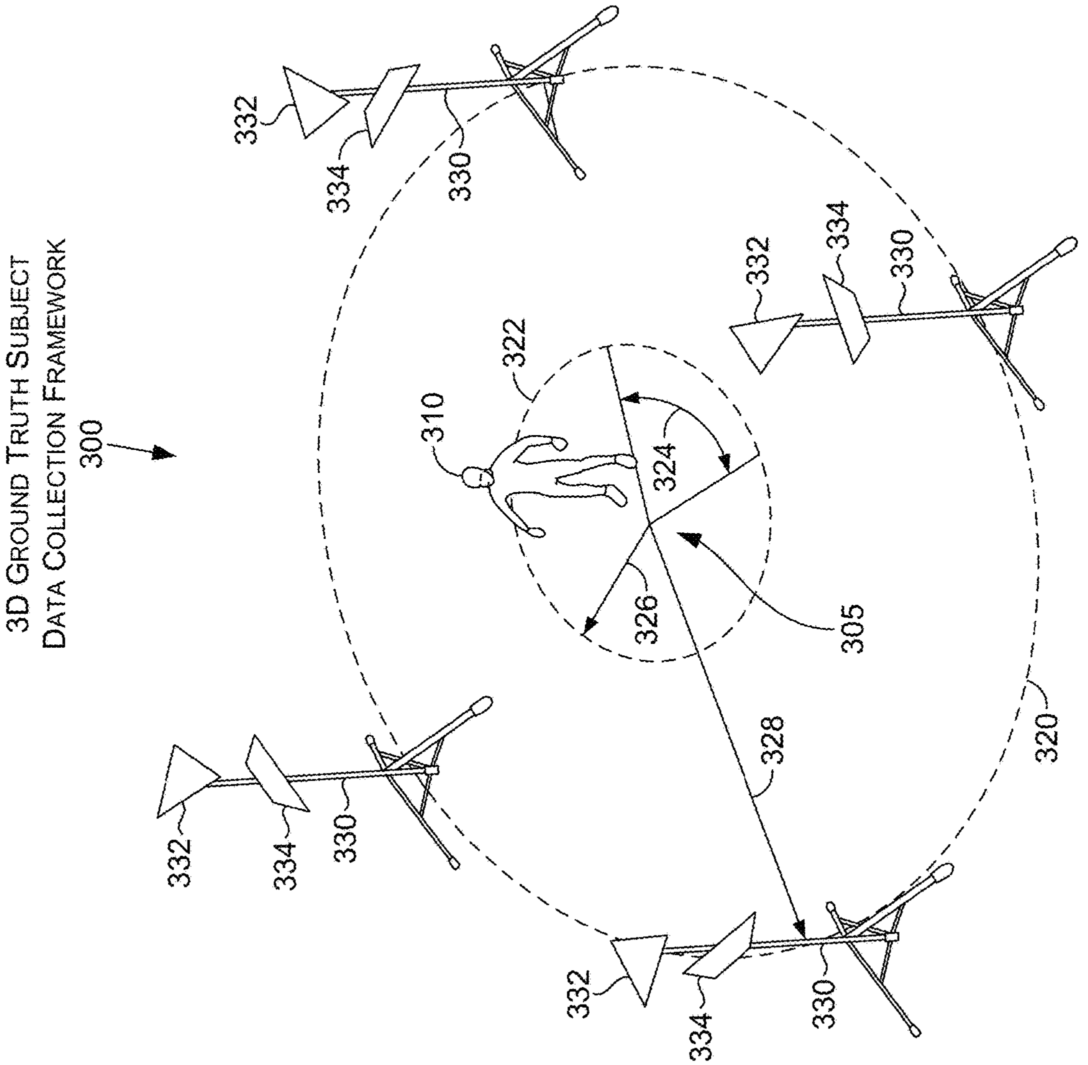
FIG. 3A is a diagram illustrating a ground truth subject data collection framework for generating 3D ground truth subject data, in accordance with some embodiments of the present disclosure.
Figure 3B:
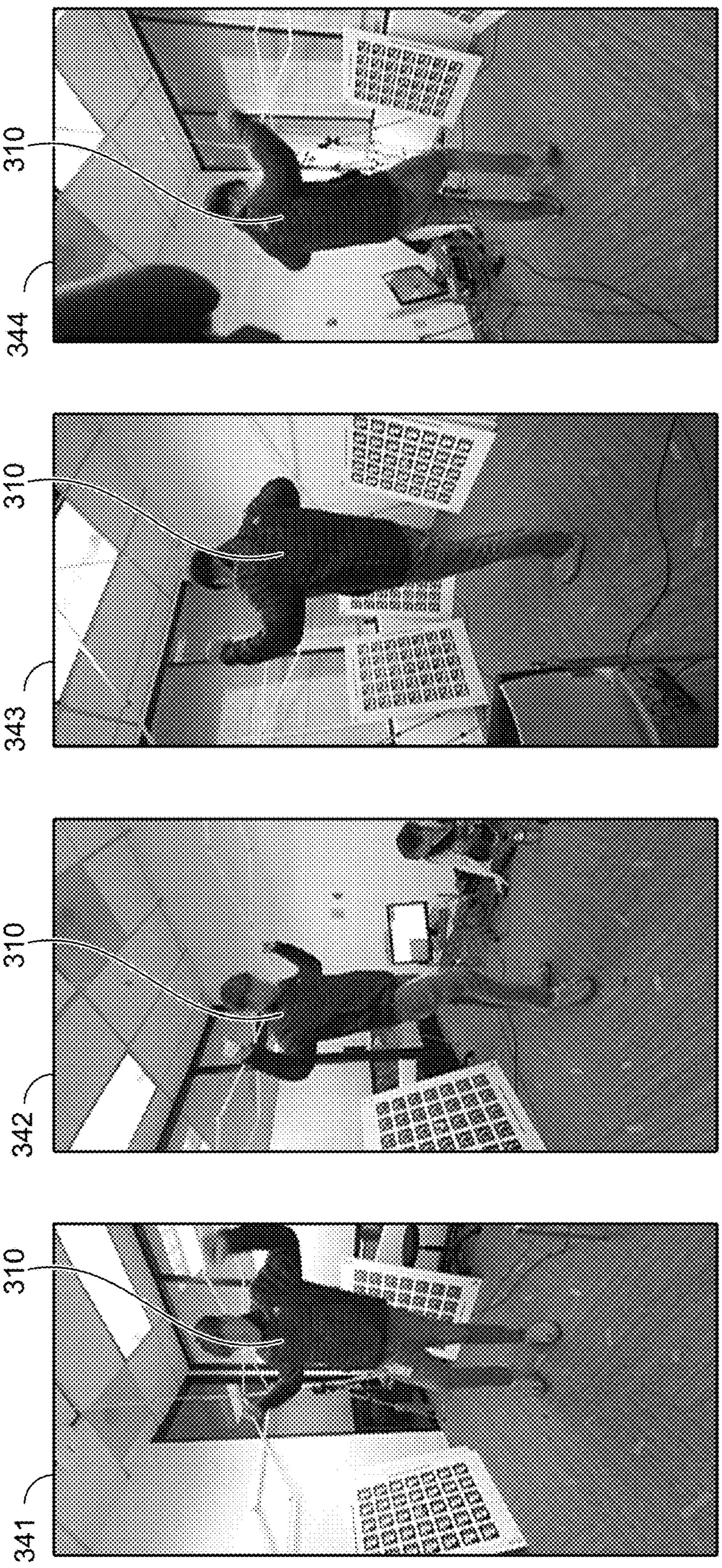
FIG. 3B is a diagram illustrating an example of capturing synchronized frames of a training subject pose from different viewpoints using the ground truth subject data collection framework, in accordance with some embodiments of the present disclosure.
Figure 3C:
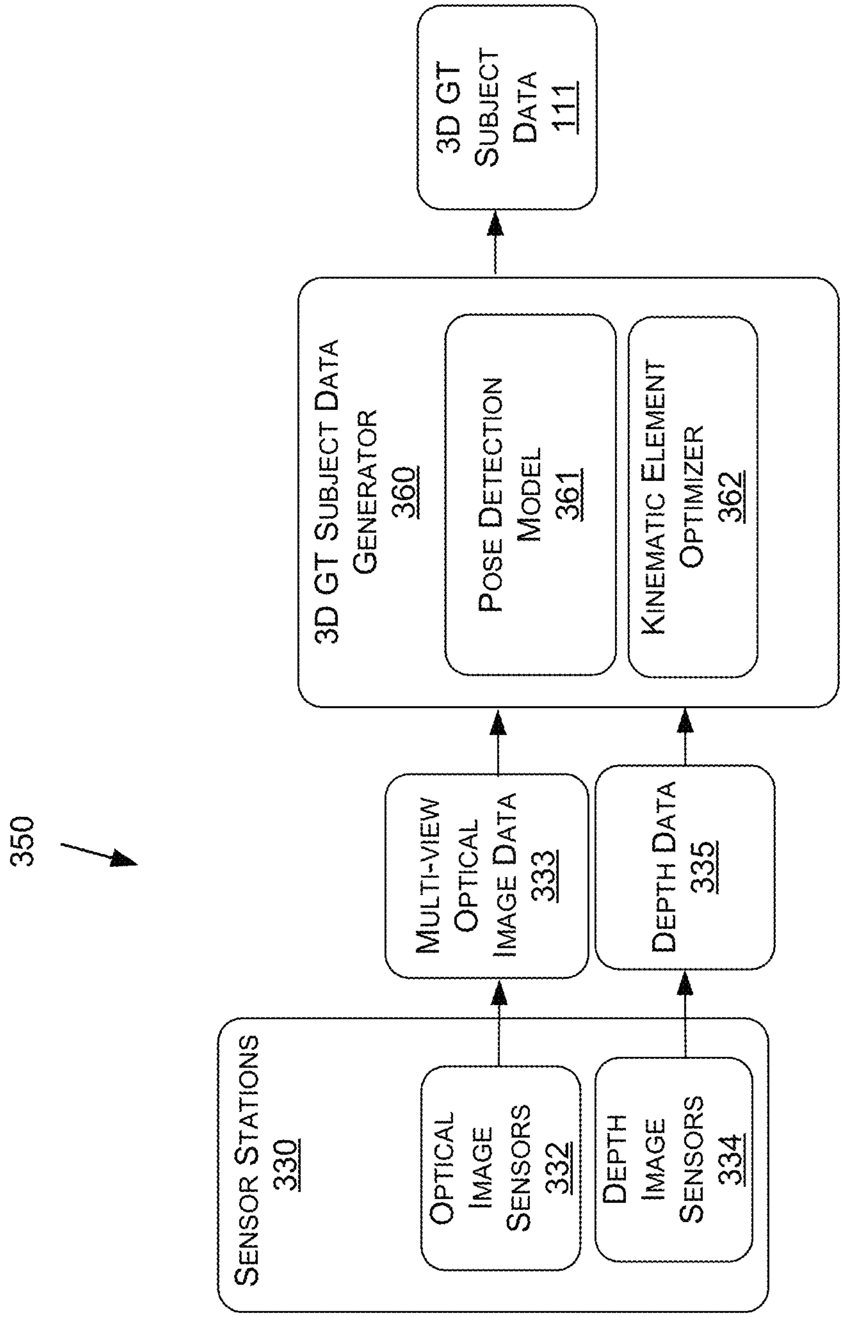
FIG. 3C is a data flow diagram illustrating an example 3D ground truth subject data generator, in accordance with some embodiments of the present disclosure.
Figure 3D:
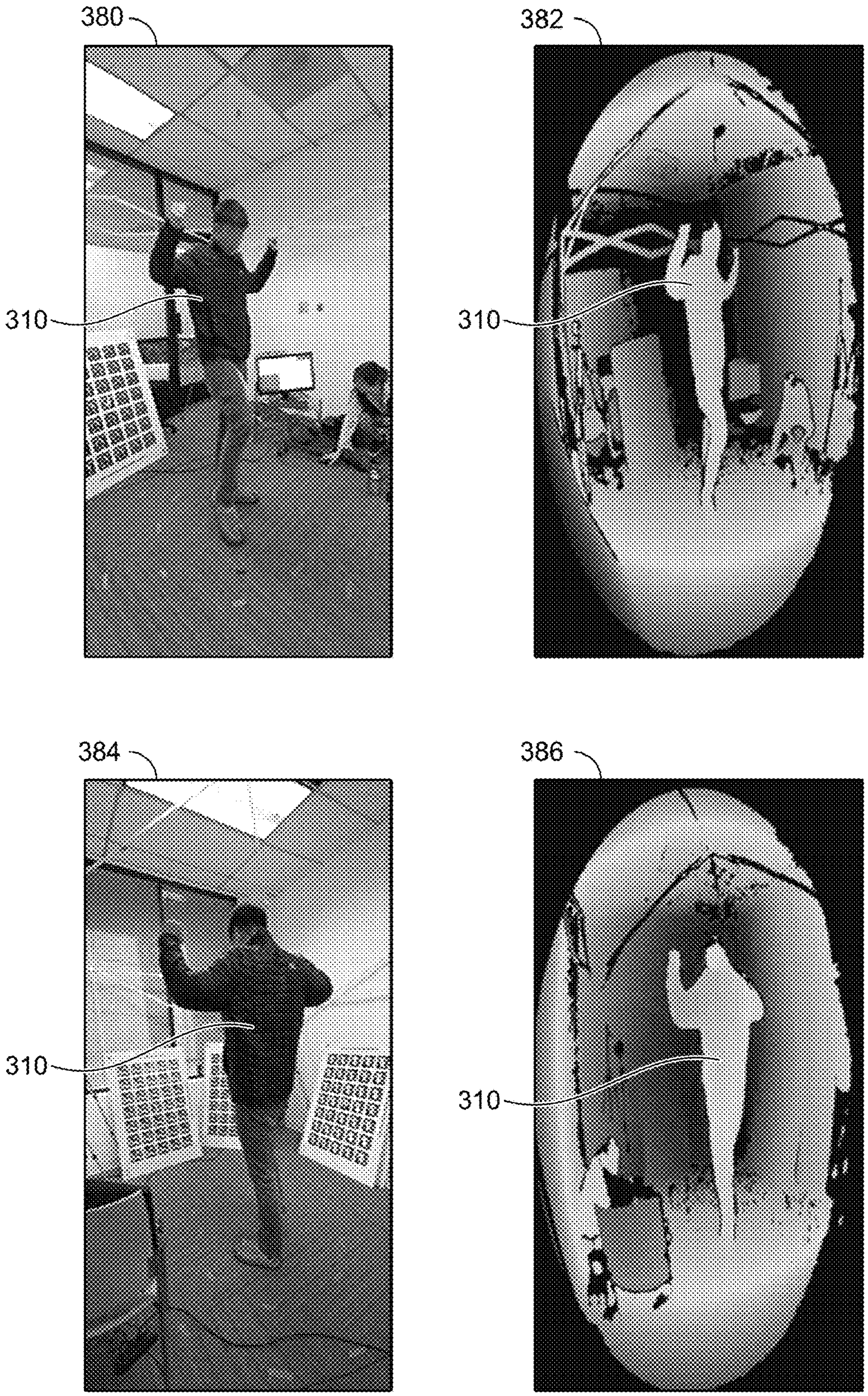
FIG. 3D is a diagram illustrating an example of captured optical image and depth image pose data of a training subject from different viewpoints using the ground truth subject data collection framework, in accordance with some embodiments of the present disclosure.

As illustrated in FIG. 3A, 3D ground truth subject data collection framework 300 may comprise a plurality of sensor stations 330. A sensor station 330 may comprise a depth image sensor 334 and/or an optical image sensor 332. The sensor stations 330 may be positioned around a perimeter 320 of the 3D ground truth subject data collection framework 300 and directed at a training subject staging point 305 where the training subject 310 is located. For example, the sensor stations 330 may be arranged around the training subject staging point 305 at angular offsets 324 from each other such that their fields of view collectively capture the training subject 310 from 360 degrees. In one or more embodiments, such as the embodiment shown in FIG. 3A, the 3D ground truth subject data collection framework 300 comprises four sensor stations 330 placed approximately 90 degrees apart around the perimeter 320 at a known distance 328 from the training subject staging point 305. In other embodiments, a fewer or greater number of sensor stations 330 may be used at different positions around the training subject staging point 305. The optical image sensor 332 and/or a depth image sensor 334 of each sensor station 330 may be positioned at known elevations above a plane of the training subject staging point 305. The image sensors 332 and/or depth image sensors 334 may be calibrated to a common coordinate reference frame (e.g., a defined reference frame for the 3D ground truth subject data collection framework 300). For example, the sensors of the sensor stations 330 may be calibrated to a common coordinate reference frame by deriving an RT transform that accounts for the rotation and translation of the sensors as-installed and their known relative locations and distance around the training subject staging point 305. As such, a feature appearing at a 2D pixel coordinate in the local 2D coordinate system of one of the sensors may be mapped to a 2D pixel coordinate in the local 2D coordinate system of any of the sensors using their respective extrinsic calibration parameters, and/or translated to a 3D point expressed in the common coordinate reference frame.

In some embodiments, to generate the 3D ground truth subject data 111, the training subject 310 may be positioned at the training subject staging point 305 (e.g., within an area 322 having a defined distance 326 of the training subject staging point 305) and prompted to proceed through a series of poses as the sensors of the sensor stations 330 synchronously capture a set of concurrent images of the training subject 310 from the different viewpoints. For example, the training subject may stand at the staging point and assume a standard "T" pose in which they stand up straight with their arms fully extended from their sides, while the sensor stations 330 capture range and/or optical images of the training subject from the different viewpoints. As an example, FIG. 3B illustrates four viewpoints 341, 342, 343, and 344 from which the pose of the training subject 310 is simultaneously captured by the sensor stations 330, such as in the embodiment shown in FIG. 3A. The training subject 310 may assume a predesignated pose selected to emphasize characteristics of one or more kinematic elements of interest, such as limb lengths and/or distances and/or relationships between body joints. While in the pose, the sensor stations 330 synchronously capture a set of concurrent images of the training subject 310. In some embodiments, the training subject 310 may rotate while in the pose to increase the number of different viewpoints captured by the sensor stations 330. Collecting 3D ground truth subject data in this manner may facilitate the collection of a set of kinematic element data for the full body of the training subject, and/or a portion thereof, with limbs extended into positions not otherwise practical (e.g., from within the confinement of a vehicle cabin) and free from obstructions that may otherwise occlude observation of one or more kinematic elements.

Referring now to FIG. 3C, FIG. 3C at 350 illustrates an example 3D ground truth subject data generator 360, according to some embodiments, for generating the 3D ground truth subject data 111, such as 3D ground truth kinematic elements and/or 3D ground truth shape elements. In some embodiments, the 3D ground truth subject data generator 360 may input a set of concurrent images from the sensor stations 330 that capture the training subject 310 in one or more poses from the different viewpoints of the plurality of sensor stations 330. For example, in some embodiments, the 3D ground truth subject data generator 360 may input a set of multi-view optical image data 333 (e.g., optical image frames) corresponding to the pose of the training subject 310 synchronously, as captured by the optical image sensors 332. In some embodiments, the 3D ground truth subject data generator 360 may input a set of concurrent depth data (e.g., range image data) 335 corresponding to the pose of the training subject 310 synchronously, as captured by the depth image sensors 334. Moreover, in some embodiments, the optical image data 333 and range image data 335 may both be synchronously captured together. For example, FIG. 3D illustrates a set of optical image data 333 and range image data 335 synchronously captured by sensor of a pair of sensor stations 330. In FIG. 3D, the training subject 310 has assumed a pose at the training subject staging point 305 and that pose is captured by the sensors of a first sensor station 330 and a second sensor station 330. For example, image frame 380 illustrates an example optical image frame of the training subject 310 in a pose from a first viewpoint of a first sensor station 330 that shows the training subject's front side, while image frame 382 is an example range image captured from the same viewpoint simultaneously with image frame 380 (e.g., where pixel values of the range image represent depth data). Image frame 384 illustrates an example optical image frame of the training subject 310 in the same pose from a second viewpoint of a second sensor station 330 that shows the training subject from their back side, while image frame 386 is an example range image captured from the same second viewpoint simultaneously with image frame 384 (e.g., where pixel values of the range image comprise depth data). In some embodiments, the image frames 380, 382, 384, and 386 are captured simultaneously, and thus may provide the 3D ground truth subject data generator 360 with diverse sources of data depicting the training subject in the same pose position.

The collected sets of multi-view optical image data 333 and/or multi-view depth data 335 may be evaluated by the 3D kinematic element data generator 360 using, for example, a pose detection model 361, to detect the location of a set of kinematic elements appearing in the depth and/or image frames, and/or to estimate a 3D shape of the training subject 310. The 3D kinematic element data generator 360 may include a kinematic element optimizer 362 to optimize estimated distances between body joints based on the detected set of kinematic elements and/or 3D shape estimate. The kinematic element optimizer 362 may further estimate distances between different pairs of body joints and correlate those distances into the limb lengths that are used to generate the 3D ground truth subject data 111. In some embodiments, the set of kinematic elements may be optimized by the kinematic element optimizer 362 based on aligning predicted 3D positions of one or more kinematic elements from a given pose of the training subject captured at different viewpoints. In some embodiments, a 3D pose estimate may be computed for one or more of the poses assumed by the training subject, and the set of concurrent images from the sensor stations 330 capturing those poses labeled based on the 3D pose estimates generated by the pose detection model 361 and/or kinematic element optimizer 362 to generate the 3D ground truth subject data 111.

In some embodiments, a combination of optical image frames and range image frames may be captured to produce the 3D ground truth subject data 111 and/or produce a 3D reconstruction of the training subject 310. For example, in some embodiments, range image frames from depth image data 335 may be used to generate data to detect and evaluate the ground truth skeleton elements and/or a 3D shape estimation, while optical image frames from multi-view optical image data 333 are used to produce a 3D mesh around the skeleton elements to produce more accurate 3D ground truth subject data 111.

In some embodiments, the pose detection model 120 (or other machine learning model) may be trained, at least in part, using such labeled 3D ground truth subject data 111. For example, in some embodiments, the occupant pose detection model 120 may be further trained based on labeled 3D pose training data comprising the 3D ground truth subject data 111 to more generally recognized pose variations. For example, 3D ground truth subject data 111 comprising a set of ground truth labeled images of a given pose captured at different viewpoints may be given as an input to the pose detection model 120, and the pose detection model 120 may be executed to predict a 3D pose estimate 122 for one or more kinematic elements represented by the labeled data. The loss feedback 148 in such an embodiment may comprise the alignment loss computed from the 3D pose estimate predicted 3D coordinates of the one or more kinematic elements for the different viewpoints. In addition to being used in the training of the pose detection model 120 as discussed herein, the 3D ground truth subject data 111 may be used as ground truth data for supervised and/or weakly supervised multi-view training for several features such as, but not limited to, 3D pose estimation, 3D shape estimation, monocular depth estimation, and/or activity recognition, for example.

Figure 4:
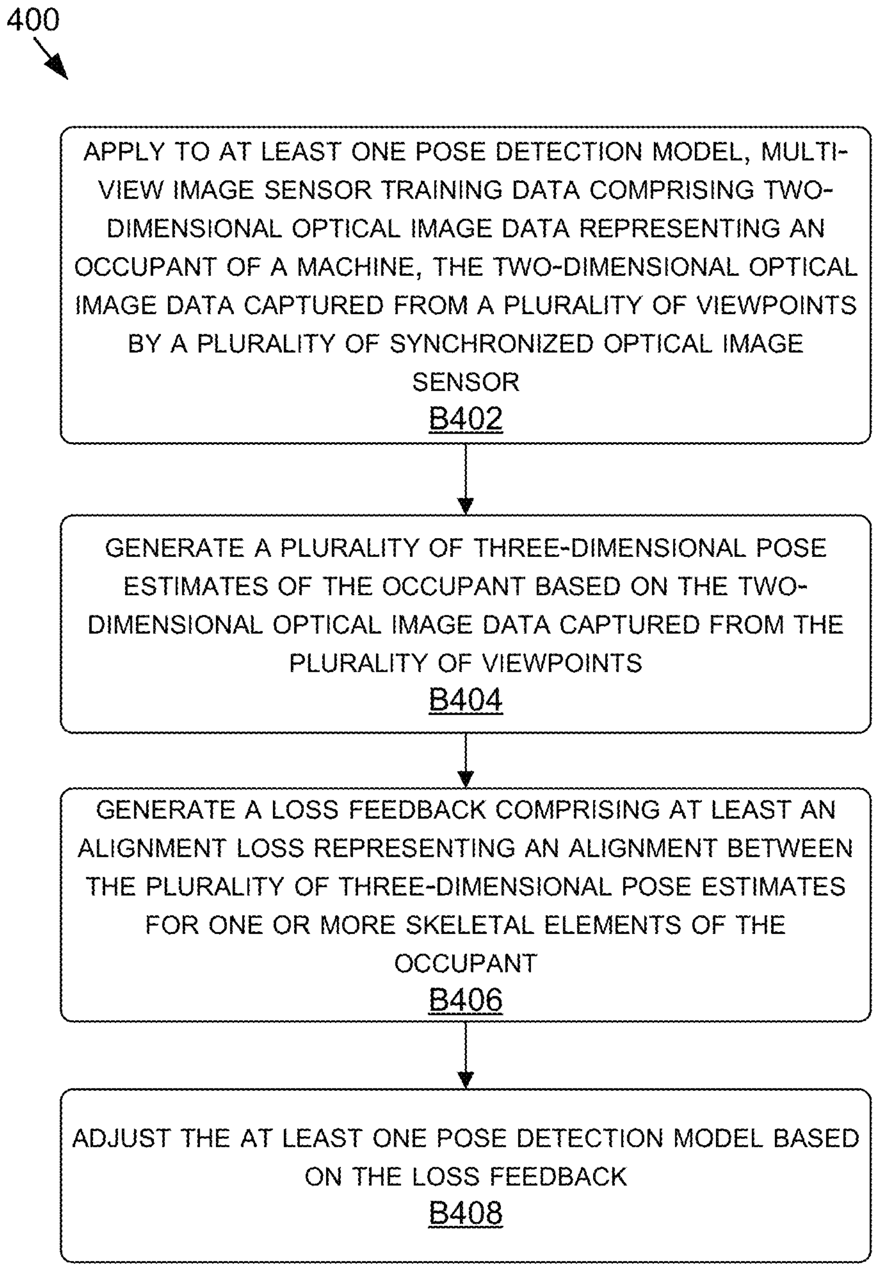
FIG. 4 is a diagram illustrating an example method for pose detection model training, in accordance with some embodiments of the present disclosure.

Now referring to FIG. 4, FIG. 4 is a flow diagram showing a method 400 for pose detection model training, in accordance with some embodiments of the present disclosure. It should be understood that the features and elements described herein with respect to the method 400 of FIG. 4 may be used in conjunction with, in combination with, or substituted for elements of any of the other embodiments discussed herein and vice versa. Further, it should be understood that the functions, structures, and other descriptions of elements for embodiments described in FIG. 4 may apply to like or similarly named or described elements across any of the figures and/or embodiments described herein and vice versa.

Each block of method 400, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 400 is described, by way of example, with respect to the pose detection model training system of FIG. 1. However, these methods may additionally or alternatively be executed by any one system, or any combination of systems, including, but not limited to, those described herein.

FIG. 4 is a flow diagram showing a method 400 for pose detection model training, in accordance with some embodiments of the present disclosure. Method 400 may be used, among other things, for training an occupant pose detection model (e.g., the pose detection model 120) to produce a 3D pose estimate of a vehicle occupant from a single monocular image frame and/or a sequence of monocular image frames.

The method 400 at block B402 includes applying to at least one pose detection model (e.g., pose detection model 120), multi-view image sensor training data (e.g., multi-view image sensor training data 107) comprising two-dimensional optical image data representing an occupant of a vehicle, the two-dimensional optical image data captured from a plurality of viewpoints by a plurality of synchronized optical image sensors. Optical image sensors may comprise, for example, monocular optical image sensors 106 such as a camera that captures RGB, IR, and/or RGB-IR image frames. Multi-view image sensor training data may include a set of image frames that captures a pose of a training subject within a vehicle interior 105 using multiple synchronized optical image sensors placed around the vehicle interior (e.g., as illustrated in FIG. 2A) that produce a set of contemporaneously captured image frames of the training subject from different perspectives. The multiple optical image sensors 106 used to capture the multi-view image sensor training data 107 may be arranged at different positions within the vehicle interior. In some embodiments, in order to generalize the training of the occupant pose detection model, a diverse set of training subjects may be used, including adults and children of various sizes.

The method 400 at block B404 includes generating a plurality of three-dimensional pose estimates of the occupant based on the two-dimensional optical image data captured from the plurality of viewpoints. For example, the occupant pose detection model 120 may receive the multi-view image sensor training data 107 and produce a set of individual, predicted 3D pose estimates 122 for the training subject from a captured image frame from each of the respective optical image sensors 106. The 3D pose estimates may indicate 3D coordinates for one or more kinematic elements of the training subject, such as body joints and/or body limbs. In some embodiments, the method may further include applying 3D ground truth subject data representing ground truth values corresponding to the one or more kinematic elements of the training subject and/or a 3D size estimate of the training subject and generating the plurality of three-dimensional pose estimates of the occupant further based on the 3D ground truth subject data.

The method 400 at block B406 includes generating a loss feedback comprising at least an alignment loss representing an alignment between the plurality of three-dimensional pose estimates for one or more kinematic elements of the occupant. For example, to train and adjust the occupant pose detection model 120 to improve the accuracy of predicted 3D pose estimates, a loss feedback 148 may be generated (e.g., by a loss feedback generator 140) using a weakly supervised approach. The loss feedback 148 used to adjust the occupant pose detection model 120 based on the accuracy of the set of individual, predicted 3D pose estimates 122 may comprise a combination of a pose alignment loss, a pose depth loss, and/or a ground truth kinematic loss, as discussed above.

Also as discussed above, the multiple image sensors used for capturing the multi-view image sensor training data may be calibrated to a common coordinate reference frame by deriving a rotation-translation (RT) transform that accounts for the rotation and translation of an image sensor as-installed so that the 2D coordinate space of a captured image frame may be mapped, for example, to a 3D cabin coordinate system of the vehicle. In some embodiments, the method 400 may therefore include applying at least one calibration parameter for the plurality of synchronized optical image sensors to at least one three-dimensional pose estimate of the plurality of three-dimensional pose estimates to map the plurality of three-dimensional pose estimates to a common three-dimensional coordinate reference frame. In other words, extrinsic calibration parameters for the multiple optical image sensors 107 may be used to project individual, predicted 3D pose estimates 122 generated by the occupant pose detection model 120 into a common 3D coordinate reference frame, and determine how well predicted kinematic elements (e.g., joints between body limbs) of the training subject from the different 3D pose estimates are aligned in the common 3D coordinate reference frame. The several predicted 3D pose estimates, if accurately predicted, should closely align when superimposed (e.g., by the pose alignment function 142) onto each other (e.g., within the tolerances of the sensor calibrations). For example, predicted 3D coordinates of the wrist, elbow, shoulder, and/or neck kinematic elements from each of the set of predicted 3D pose estimates 122, when projected into the common 3D coordinate reference frame, should align with each other. The degree to which the predicted 3D coordinates of these kinematic elements do (or do not) align between the individual predicted 3D pose estimates may be computed using an alignment algorithm to derive an alignment loss. The alignment loss may be fed back as a component of the loss feedback 148 to adjust the pose detection model 120.

In some embodiments, the method 400 may further comprise computing a pose depth using ground truth depth data (e.g., ground truth depth data 109) derived from, for example, a depth sensor (e.g., depth sensor 108) that produces a 2D range image of the training subject in the vehicle interior as the multi-view image sensor data is captured. Ground truth depth data representing the occupant may be input from a depth sensor 108 synchronized with the plurality of synchronized optical image sensors 106 and a pose depth loss generated that represents a difference between a depth of the one or more kinematic elements represented by the plurality of three-dimensional pose estimates and the depth of the one or more kinematic elements represented by the ground truth depth data. A component of the loss feedback 148 may comprise the pose depth loss. In embodiments, the ground truth depth data 109 may comprise a 2D range image frame of pixels where the pixel values of the pixels correspond to a distance from the depth sensor to the training subject and other elements in the depth sensor's field of view. The depth sensor may be calibrated to the same common coordinate reference frame as the image sensors that capture the multi-view image sensor data. As discussed above, for a given image frame captured by one of the multiple image sensors, the depth data (e.g., the pixel values of the range image) may be correlated with the pixels of an image frame captured by that image sensor and/or mapped to the common coordinate reference frame. As such, a sense of depth ground truth can be established for each of the features appearing in each of the frames of multi-view image frame data, including establishing a depth for pixels in those images that correspond to kinematic elements (e.g., body joints and limbs).

By mapping the 2D range image from the depth sensor to the field of view of an image sensor, a distance value can be assigned to pixels of an image frame corresponding to kinematic elements (e.g., the wrist, elbow, and/or shoulder). This distance can be compared to a distance from the image sensor to the kinematic elements (e.g., the wrist, elbow, and/or shoulder) using 3D coordinates from the 3D pose estimates. The difference between the range image-based distance and the 3D pose estimate-based distance for each kinematic element at least in part represents an error in the 3D pose estimate that may be used as a component of loss feedback for training the occupant pose detection model. In some embodiments, the degree to which the range image-derived distance and pose estimate-based distances agree may be computed using a depth comparison algorithm to derive a pose depth loss which may be fed back as another component of the loss feedback to adjust the pose detection model.

In some embodiments, the method 400 may further comprise generating a ground truth kinematic loss using 3D ground truth subject data (e.g., 3D ground truth subject data 111) captured from the training subject as described above with respect to FIGS. 3A-3D. 3D ground truth subject data may be used that represents ground truth values corresponding to the one or more kinematic elements of the training subject and/or a 3D size estimate of the training subject, and a kinematic loss representing a correlation may be generated based on a length of at least a first body limb of the one or more kinematic elements represented by the plurality of three-dimensional pose estimates and the length of at least the first body limb of the one or more kinematic elements represented by the 3D ground truth subject data. A component of the loss feedback 148 may comprise the kinematic loss. The 3D ground truth subject data may comprise at least a set of body limb lengths captured from the occupant and/or a 3D size estimate and/or may be derived from a plurality of image frames synchronously captured from different viewpoints of the occupant by a plurality of sensors. In some embodiments, the 3D ground truth subject data is derived from a set of kinematic elements detected from a plurality of image frames representing a pose of the occupant captured from different viewpoints, as described above with respect to FIGS. 3A-3D.

For example, image frames representing the training subject may be captured from different viewpoints and ground truth values for various body limb lengths (e.g., distances between body joints) computed from the image frames. The resulting set of body limb lengths may define a set of kinematic ground truth data for that training subject, which may be used to compute the ground truth kinematic loss for training the occupant pose detection model. When the occupant pose detection model generates the set of individual, predicted 3D pose estimates from the multi-view image sensor data during training, the distances between predicted 3D coordinates of kinematic elements from the predicted 3D pose estimates may be compared to the ground truth limb lengths. Because the training subject's limb lengths are fixed and invariant, a distance between 3D coordinates from a 3D pose estimate for the training subject's wrist and elbow should agree with (e.g., approximately equate to within an acceptance criteria) the ground truth limb length of the training subject's lower arm. Distances between body joints for one or more limbs of the training subject—as represented in the 3D pose estimates generated by the occupant pose detection model—may be compared to ground truth limb lengths for the corresponding limb of the training subject and the ground truth kinematic loss computed. The difference between the ground truth limb lengths and the 3D pose estimate-based limb lengths at least in part represent an error in the 3D pose estimate that may be used as a component of the loss feedback 148 for training the occupant pose detection model 120. In some embodiments, the degree to which the ground truth limb lengths and the 3D pose estimate-based limb lengths agree may be computed by the kinematic element comparison function 146 using a kinematic comparison algorithm to derive a ground truth kinematic loss, which may be fed back as another component of the loss feedback 148 to adjust the pose detection model 120.

The method 400 at block B408 includes adjusting the at least one pose detection model based on the loss feedback. For example, the alignment loss computed by the pose alignment function 142 may adjust the pose detection model 120 by rewarding and/or penalizing the model based on how well the detected kinematic elements (e.g., joints and limbs) of the training subject align in the multiple 3D pose estimates 122. The greater the degree of misalignment of kinematic elements between the 3D pose estimates, the greater the alignment loss. In this way, based on the 2D multi-view image sensor data 107, the pose detection model 120 is able to learn to predict a 3D pose from 2D images without a need for 3D pose ground truth training data. In some embodiments, the occupant pose detection model 120 may constrain a range of 3D pose coordinates that may be validly predicted for a kinematic element based on a ray that extends from the image sensor through a 2D pixel coordinate (u, v) of the kinematic element. Pose depth loss computed by pose depth comparison function 144 represents a ground truth-based constraint that may be used to adjust the occupant pose detection model to better predict where along that ray the kinematic element is located. The ground truth kinematic loss computed by the kinematic element comparison function 146 represents another ground truth-based constraint that may be used to adjust the occupant pose detection model to better predict the 3D position of the body joint given the known distances that fixed limb lengths for a training subject imposed between body joints.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation, autonomous or semi-autonomous machine applications, deep learning, environment simulation, object or actor simulation and/or digital twinning, data center processing, conversational AI, generative AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing generative AI operations using a language model, systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Example Autonomous Vehicle

Figure 5A:
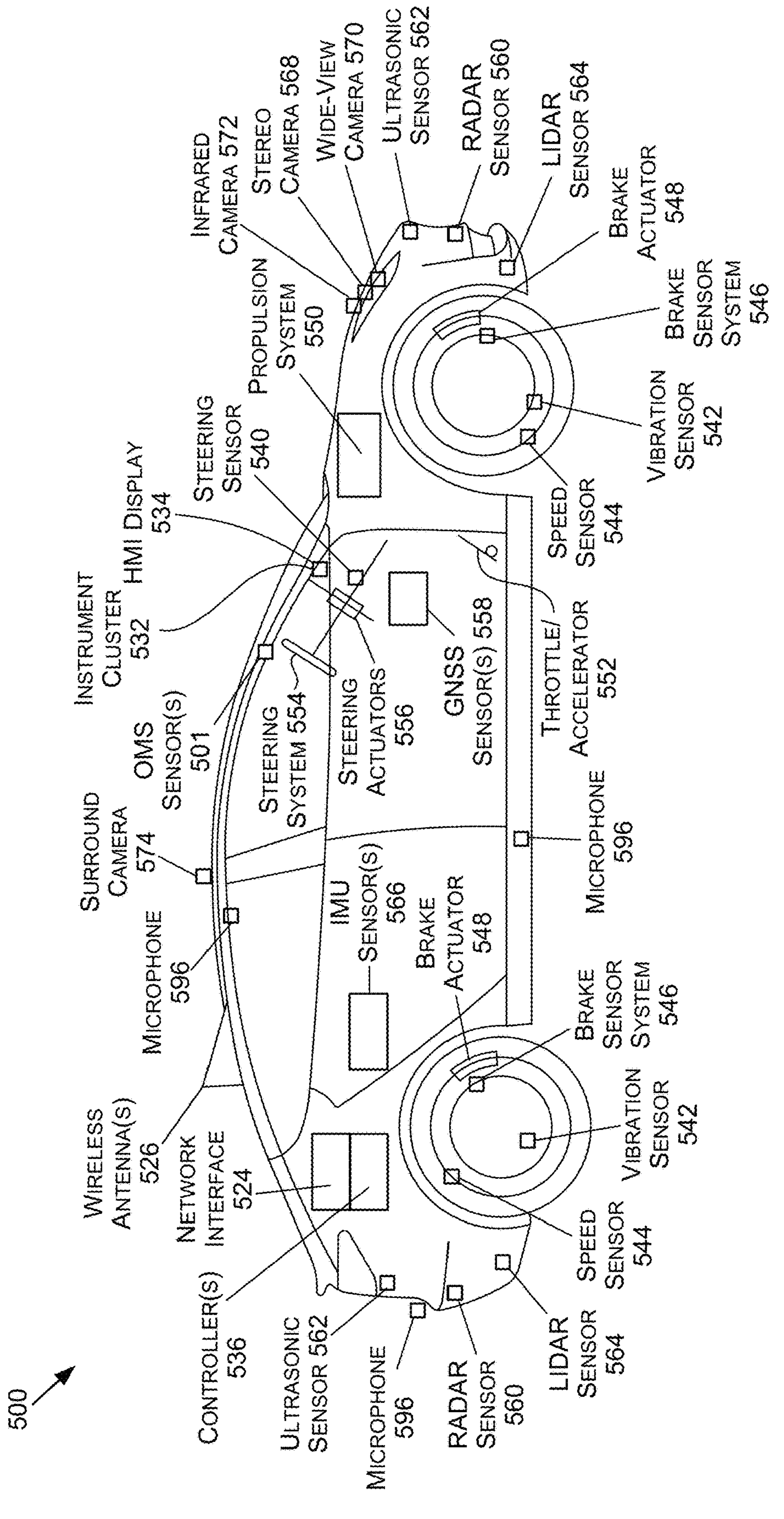
FIG. 5A is an illustration of an example autonomous vehicle, in accordance with some embodiments of the present disclosure.

FIG. 5A is an illustration of an example autonomous vehicle 500, in accordance with some embodiments of the present disclosure. The autonomous vehicle 500 (alternatively referred to herein as the "vehicle 500") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 500 may be capable of functionality in accordance with one or more of Level 3-Level 5 of the autonomous driving levels. The vehicle 500 may be capable of functionality in accordance with one or more of Level 1-Level 5 of the autonomous driving levels. For example, the vehicle 500 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 500 or other machine, such as being fully autonomous, being highly autonomous, being conditionally autonomous, being partially autonomous, providing assistive autonomy, being semi-autonomous, being primarily autonomous, or other designation.

The vehicle 500 may include components such as a chassis, a vehicle body, wheels (e.g., 2, 4, 6, 8, 18, etc.), tires, axles, and other components of a vehicle. The vehicle 500 may include a propulsion system 550, such as an internal combustion engine, hybrid electric power plant, an all-electric engine, and/or another propulsion system type. The propulsion system 550 may be connected to a drive train of the vehicle 500, which may include a transmission, to enable the propulsion of the vehicle 500. The propulsion system 550 may be controlled in response to receiving signals from the throttle/accelerator 552.

A steering system 554, which may include a steering wheel, may be used to steer the vehicle 500 (e.g., along a desired path or route) when the propulsion system 550 is operating (e.g., when the vehicle is in motion). The steering system 554 may receive signals from a steering actuator 556. The steering wheel may be optional for full automation (Level 5) functionality.

The brake sensor system 546 may be used to operate the vehicle brakes in response to receiving signals from the brake actuators 548 and/or brake sensors.

Controller(s) 536, which may include one or more system on chips (SoCs) 504 (FIG. 5C) and/or GPU(s), may provide signals (e.g., representative of commands) to one or more components and/or systems of the vehicle 500. For example, the controller(s) may send signals to operate the vehicle brakes via one or more brake actuators 548, to operate the steering system 554 via one or more steering actuators 556, to operate the propulsion system 550 via one or more throttle/accelerators 552. The controller(s) 536 may include one or more onboard (e.g., integrated) computing devices (e.g., supercomputers) that process sensor signals, and output operation commands (e.g., signals representing commands) to enable autonomous driving and/or to assist a human driver in driving the vehicle 500. The controller(s) 536 may include a first controller 536 for autonomous driving functions, a second controller 536 for functional safety functions, a third controller 536 for artificial intelligence functionality (e.g., computer vision), a fourth controller 536 for infotainment functionality, a fifth controller 536 for redundancy in emergency conditions, and/or other controllers. In some examples, a single controller 536 may handle two or more of the above functionalities, two or more controllers 536 may handle a single functionality, and/or any combination thereof.

The controller(s) 536 may provide the signals for controlling one or more components and/or systems of the vehicle 500 in response to sensor data received from one or more sensors (e.g., sensor inputs). The sensor data may be received from, for example and without limitation, global navigation satellite systems ("GNSS") sensor(s) 558 (e.g., Global Positioning System sensor(s)), RADAR sensor(s) 560, ultrasonic sensor(s) 562, LIDAR sensor(s) 564, inertial measurement unit (IMU) sensor(s) 566 (e.g., accelerometer(s), gyroscope(s), magnetic compass(es), magnetometer(s), etc.), microphone(s) 596, stereo camera(s) 568, wide-view camera(s) 570 (e.g., fisheye cameras), infrared camera(s) 572, surround camera(s) 574 (e.g., 360 degree cameras), long-range and/or mid-range camera(s) 598, speed sensor(s) 544 (e.g., for measuring the speed of the vehicle 500), vibration sensor(s) 542, steering sensor(s) 540, brake sensor(s) (e.g., as part of the brake sensor system 546), one or more occupant monitoring system (OMS) sensor(s) 501 (e.g., one or more interior cameras), and/or other sensor types.

One or more of the controller(s) 536 may receive inputs (e.g., represented by input data) from an instrument cluster 532 of the vehicle 500 and provide outputs (e.g., represented by output data, display data, etc.) via a human-machine interface (HMI) display 534, an audible annunciator, a loudspeaker, and/or via other components of the vehicle 500. The outputs may include information such as vehicle velocity, speed, time, map data (e.g., the High Definition ("HD") map 522 of FIG. 5C), location data (e.g., the vehicle's 500 location, such as on a map), direction, location of other vehicles (e.g., an occupancy grid), information about objects and status of objects as perceived by the controller(s) 536, etc. For example, the HMI display 534 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 500 further includes a network interface 524 which may use one or more wireless antenna(s) 526 and/or modem(s) to communicate over one or more networks. For example, the network interface 524 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 526 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 5B:
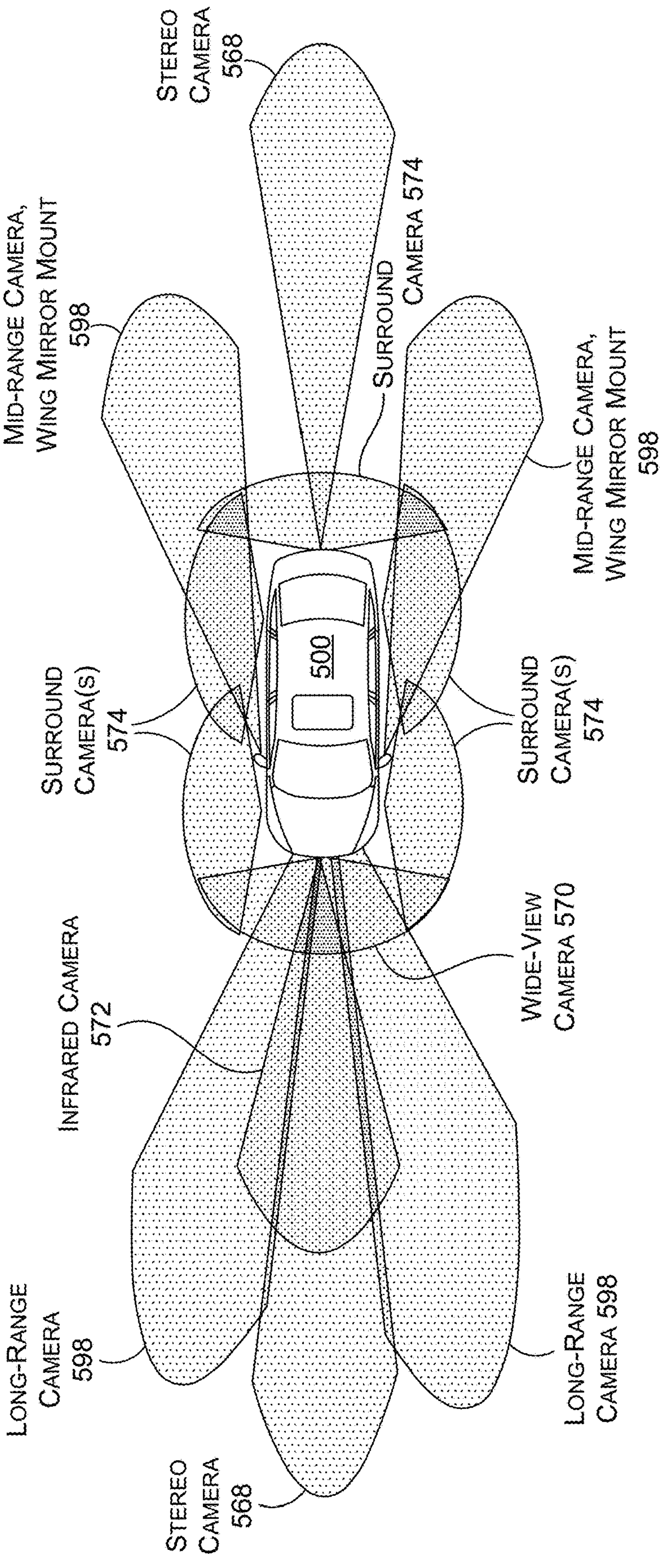
FIG. 5B is an example of camera locations and fields of view for the example autonomous vehicle of FIG. 5A, in accordance with some embodiments of the present disclosure.

FIG. 5B is an example of camera locations and fields of view for the example autonomous vehicle 500 of FIG. 5A, in accordance with some embodiments of the present disclosure. The cameras and respective fields of view are one example embodiment and are not intended to be limiting. For example, additional and/or alternative cameras may be included and/or the cameras may be located at different locations on the vehicle 500.

The camera types for the cameras may include, but are not limited to, digital cameras that may be adapted for use with the components and/or systems of the vehicle 500. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 500 (e.g., front-facing cameras) may be used for surround view, to help identify forward facing paths and obstacles, as well aid in, with the help of one or more controllers 536 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 570 that may be used to perceive objects coming into view from the periphery (e.g., pedestrians, crossing traffic or bicycles). Although only one wide-view camera is illustrated in FIG. 5B, there may be any number (including zero) of wide-view cameras 570 on the vehicle 500. In addition, any number of long-range camera(s) 598 (e.g., a long-view stereo camera pair) may be used for depth-based object detection, especially for objects for which a neural network has not yet been trained. The long-range camera(s) 598 may also be used for object detection and classification, as well as basic object tracking.

Any number of stereo cameras 568 may also be included in a front-facing configuration. In at least one embodiment, one or more of stereo camera(s) 568 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 568 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 568 may be used in addition to, or alternatively from, those described herein.

Cameras with a field of view that include portions of the environment to the side of the vehicle 500 (e.g., side-view cameras) may be used for surround view, providing information used to create and update the occupancy grid, as well as to generate side impact collision warnings. For example, surround camera(s) 574 (e.g., four surround cameras 574 as illustrated in FIG. 5B) may be positioned to on the vehicle 500. The surround camera(s) 574 may include wide-view camera(s) 570, fisheye camera(s), 360-degree camera(s), and/or the like. Four example, four fisheye cameras may be positioned on the vehicle's front, rear, and sides. In an alternative arrangement, the vehicle may use three surround camera(s) 574 (e.g., left, right, and rear), and may leverage one or more other camera(s) (e.g., a forward-facing camera) as a fourth surround view camera.

Cameras with a field of view that include portions of the environment to the rear of the vehicle 500 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 598, stereo camera(s) 568), infrared camera(s) 572, etc.), as described herein.

Cameras with a field of view that include portions of the interior environment within the cabin of the vehicle 500 (e.g., one or more OMS sensor(s) 501) may be used as part of an occupant monitoring system (OMS) such as, but not limited to, a driver monitoring system (DMS) and/or a child presence detection system. For example, OMS sensors (e.g., the OMS sensor(s) 501) may be used (e.g., by the controller(s) 536) to track an occupant's and/or driver's gaze direction, head pose, and/or blinking. This gaze information may be used to determine a level of attentiveness of the occupant or driver (e.g., to detect drowsiness, fatigue, and/or distraction), and/or to take responsive action to prevent harm to the occupant or operator. In some embodiments, data from OMS sensors may be used to enable gaze-controlled operations triggered by driver and/or non-driver occupants such as, but not limited to, adjusting cabin temperature and/or airflow, opening and closing windows, controlling cabin lighting, controlling entertainment systems, adjusting mirrors, adjusting seat positions, and/or other operations. In some embodiments, an OMS may be used for applications such as determining when objects and/or occupants have been left behind in a vehicle cabin (e.g., by detecting occupant presence after the driver exits the vehicle). In some embodiments, the OMS may comprise a pose detection model such as the pose detection model 120, trained as described herein.

Figure 5C:
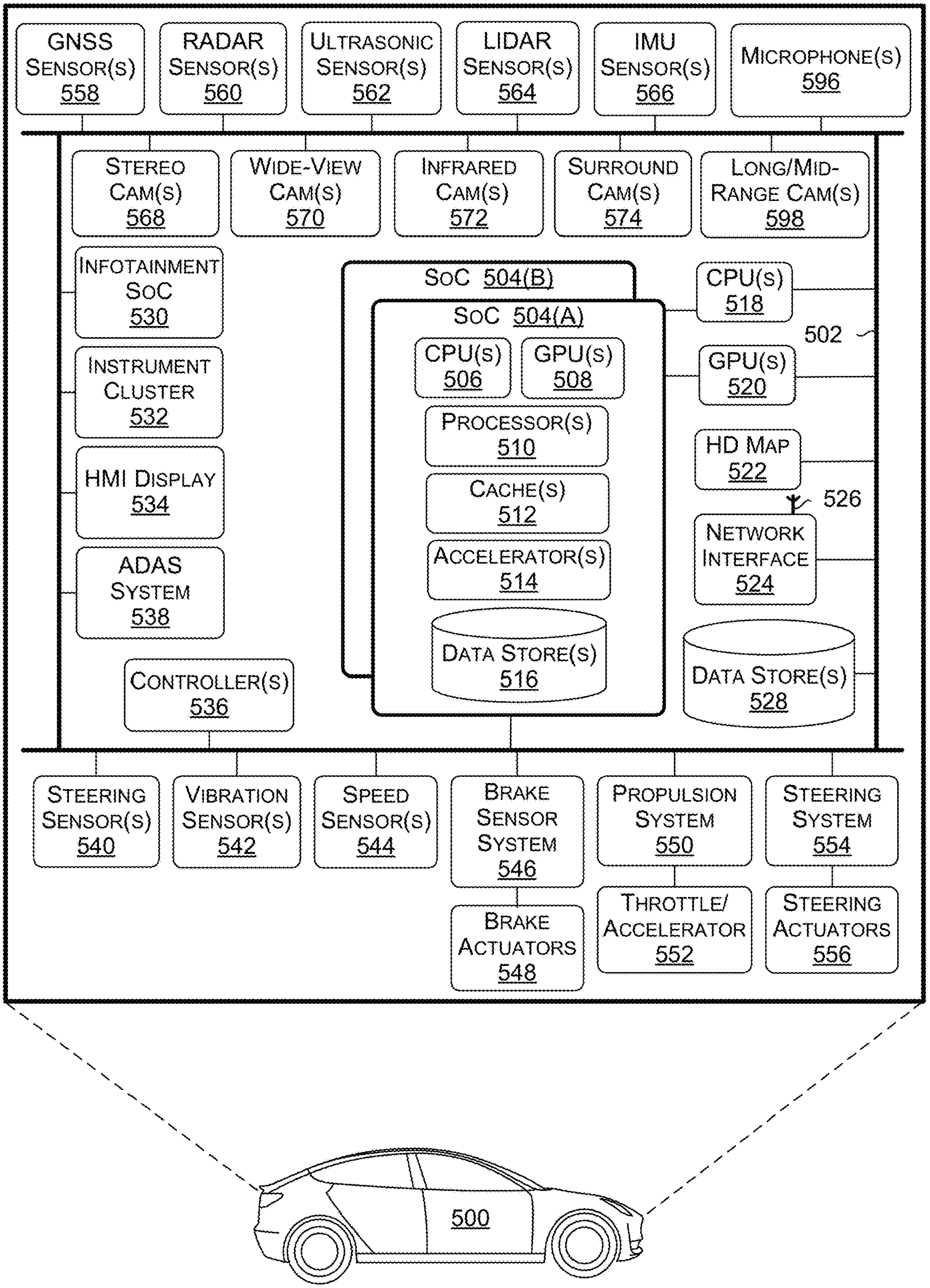
FIG. 5C is a block diagram of an example system architecture for the example autonomous vehicle of FIG. 5A, in accordance with some embodiments of the present disclosure.

FIG. 5C is a block diagram of an example system architecture for the example autonomous vehicle 500 of FIG. 5A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 500 in FIG. 5C are illustrated as being connected via bus 502. The bus 502 may include a Controller Area Network (CAN) data interface (alternatively referred to herein as a "CAN bus"). A CAN may be a network inside the vehicle 500 used to aid in control of various features and functionality of the vehicle 500, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 502 is described herein as being a CAN bus, this is not intended to be limiting. For example, in addition to, or alternatively from, the CAN bus, FlexRay and/or Ethernet may be used. Additionally, although a single line is used to represent the bus 502, this is not intended to be limiting. For example, there may be any number of busses 502, which may include one or more CAN busses, one or more FlexRay busses, one or more Ethernet busses, and/or one or more other types of busses using a different protocol. In some examples, two or more busses 502 may be used to perform different functions, and/or may be used for redundancy. For example, a first bus 502 may be used for collision avoidance functionality and a second bus 502 may be used for actuation control. In any example, each bus 502 may communicate with any of the components of the vehicle 500, and two or more busses 502 may communicate with the same components. In some examples, each SoC 504, each controller 536, and/or each computer within the vehicle may have access to the same input data (e.g., inputs from sensors of the vehicle 500), and may be connected to a common bus, such the CAN bus.

The vehicle 500 may include one or more controller(s) 536, such as those described herein with respect to FIG. 5A. The controller(s) 536 may be used for a variety of functions. The controller(s) 536 may be coupled to any of the various other components and systems of the vehicle 500, and may be used for control of the vehicle 500, artificial intelligence of the vehicle 500, infotainment for the vehicle 500, and/or the like.

The vehicle 500 may include a system(s) on a chip (SoC) 504. The SoC 504 may include CPU(s) 506, GPU(s) 508, processor(s) 510, cache(s) 512, accelerator(s) 514, data store(s) 516, and/or other components and features not illustrated. The SoC(s) 504 may be used to control the vehicle 500 in a variety of platforms and systems. For example, the SoC(s) 504 may be combined in a system (e.g., the system of the vehicle 500) with an HD map 522 which may obtain map refreshes and/or updates via a network interface 524 from one or more servers (e.g., server(s) 578 of FIG. 5D).

The CPU(s) 506 may include a CPU cluster or CPU complex (alternatively referred to herein as a "CCPLEX"). The CPU(s) 506 may include multiple cores and/or L2 caches. For example, in some embodiments, the CPU(s) 506 may include eight cores in a coherent multi-processor configuration. In some embodiments, the CPU(s) 506 may include four dual-core clusters where each cluster has a dedicated L2 cache (e.g., a 2 MB L2 cache). The CPU(s) 506 (e.g., the CCPLEX) may be configured to support simultaneous cluster operation enabling any combination of the clusters of the CPU(s) 506 to be active at any given time.

The CPU(s) 506 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 506 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 508 may include an integrated GPU (alternatively referred to herein as an "iGPU"). The GPU(s) 508 may be programmable and may be efficient for parallel workloads. The GPU(s) 508, in some examples, may use an enhanced tensor instruction set. The GPU(s) 508 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 508 may include at least eight streaming microprocessors. The GPU(s) 508 may use compute application programming interface(s) (API(s)). In addition, the GPU(s) 508 may use one or more parallel computing platforms and/or programming models (e.g., NVIDIA's CUDA).

The GPU(s) 508 may be power-optimized for best performance in automotive and embedded use cases. For example, the GPU(s) 508 may be fabricated on a Fin field-effect transistor (FinFET). However, this is not intended to be limiting and the GPU(s) 508 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 508 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 508 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 508 to access the CPU(s) 506 page tables directly. In such examples, when the GPU(s) 508 memory management unit (MMU) experiences a miss, an address translation request may be transmitted to the CPU(s) 506. In response, the CPU(s) 506 may look in its page tables for the virtual-to-physical mapping for the address and transmits the translation back to the GPU(s) 508. As such, unified memory technology may allow a single unified virtual address space for memory of both the CPU(s) 506 and the GPU(s) 508, thereby simplifying the GPU(s) 508 programming and porting of applications to the GPU(s) 508.

In addition, the GPU(s) 508 may include an access counter that may keep track of the frequency of access of the GPU(s) 508 to memory of other processors. The access counter may help ensure that memory pages are moved to the physical memory of the processor that is accessing the pages most frequently.

The SoC(s) 504 may include any number of cache(s) 512, including those described herein. For example, the cache(s) 512 may include an L3 cache that is available to both the CPU(s) 506 and the GPU(s) 508 (e.g., that is connected both the CPU(s) 506 and the GPU(s) 508). The cache(s) 512 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 504 may include an arithmetic logic unit(s) (ALU(s)) which may be leveraged in performing processing with respect to any of the variety of tasks or operations of the vehicle 500—such as processing DNNs. In addition, the SoC(s) 504 may include a floating point unit(s) (FPU(s))—or other math coprocessor or numeric coprocessor types—for performing mathematical operations within the system. For example, the SoC(s) 504 may include one or more FPUs integrated as execution units within a CPU(s) 506 and/or GPU(s) 508.

The SoC(s) 504 may include one or more accelerators 514 (e.g., hardware accelerators, software accelerators, or a combination thereof). For example, the SoC(s) 504 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 508 and to off-load some of the tasks of the GPU(s) 508 (e.g., to free up more cycles of the GPU(s) 508 for performing other tasks). As an example, the accelerator(s) 514 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 514 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events. In some embodiments, the DLA(s) may include one or more pose detection models, such as the pose detection model 120 trained as described herein.

The DLA(s) may perform any function of the GPU(s) 508, and by using an inference accelerator, for example, a designer may target either the DLA(s) or the GPU(s) 508 for any function. For example, the designer may focus processing of CNNs and floating point operations on the DLA(s) and leave other functions to the GPU(s) 508 and/or other accelerator(s) 514.

The accelerator(s) 514 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 506. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 514 (e.g., the hardware acceleration cluster) may include a computer vision network on-chip and SRAM, for providing a high-bandwidth, low latency SRAM for the accelerator(s) 514. In some examples, the on-chip memory may include at least 4 MB SRAM, consisting of, for example and without limitation, eight field-configurable memory blocks that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 504 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 514 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g., from another subsystem), inertial measurement unit (IMU) sensor 566 output that correlates with the vehicle 500 orientation, distance, 3D location estimates of the object obtained from the neural network and/or other sensors (e.g., LIDAR sensor(s) 564 or RADAR sensor(s) 560), among others.

The SoC(s) 504 may include data store(s) 516 (e.g., memory). The data store(s) 516 may be on-chip memory of the SoC(s) 504, which may store neural networks to be executed on the GPU and/or the DLA. In some examples, the data store(s) 516 may be large enough in capacity to store multiple instances of neural networks for redundancy and safety. The data store(s) 516 may comprise L2 or L3 cache(s) 512. Reference to the data store(s) 516 may include reference to the memory associated with the PVA, DLA, and/or other accelerator(s) 514, as described herein.

The SoC(s) 504 may include one or more processor(s) 510 (e.g., embedded processors). The processor(s) 510 may include a boot and power management processor that may be a dedicated processor and subsystem to handle boot power and management functions and related security enforcement. The boot and power management processor may be a part of the SoC(s) 504 boot sequence and may provide runtime power management services. The boot power and management processor may provide clock and voltage programming, assistance in system low power state transitions, management of SoC(s) 504 thermals and temperature sensors, and/or management of the SoC(s) 504 power states. Each temperature sensor may be implemented as a ring-oscillator whose output frequency is proportional to temperature, and the SoC(s) 504 may use the ring-oscillators to detect temperatures of the CPU(s) 506, GPU(s) 508, and/or accelerator(s) 514. If temperatures are determined to exceed a threshold, the boot and power management processor may enter a temperature fault routine and put the SoC(s) 504 into a lower power state and/or put the vehicle 500 into a chauffeur to safe stop mode (e.g., bring the vehicle 500 to a safe stop).

The processor(s) 510 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 510 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 510 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 510 may further include a real-time camera engine that may include a dedicated processor subsystem for handling real-time camera management.

The processor(s) 510 may further include a high-dynamic range signal processor that may include an image signal processor that is a hardware engine that is part of the camera processing pipeline.

The processor(s) 510 may include a video image compositor that may be a processing block (e.g., implemented on a microprocessor) that implements video post-processing functions needed by a video playback application to produce the final image for the player window. The video image compositor may perform lens distortion correction on wide-view camera(s) 570, surround camera(s) 574, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 508 is not required to continuously render new surfaces. Even when the GPU(s) 508 is powered on and active doing 3D rendering, the video image compositor may be used to offload the GPU(s) 508 to improve performance and responsiveness.

The SoC(s) 504 may further include a mobile industry processor interface (MIPI) camera serial interface for receiving video and input from cameras, a high-speed interface, and/or a video input block that may be used for camera and related pixel input functions. The SoC(s) 504 may further include an input/output controller(s) that may be controlled by software and may be used for receiving I/O signals that are uncommitted to a specific role.

The SoC(s) 504 may further include a broad range of peripheral interfaces to enable communication with peripherals, audio codecs, power management, and/or other devices. The SoC(s) 504 may be used to process data from cameras (e.g., connected over Gigabit Multimedia Serial Link and Ethernet), sensors (e.g., LIDAR sensor(s) 564, RADAR sensor(s) 560, etc. that may be connected over Ethernet), data from bus 502 (e.g., speed of vehicle 500, steering wheel position, etc.), data from GNSS sensor(s) 558 (e.g., connected over Ethernet or CAN bus). The SoC(s) 504 may further include dedicated high-performance mass storage controllers that may include their own DMA engines, and that may be used to free the CPU(s) 506 from routine data management tasks.

The SoC(s) 504 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 504 may be faster, more reliable, and even more energy-efficient and space-efficient than conventional systems. For example, the accelerator(s) 514, when combined with the CPU(s) 506, the GPU(s) 508, and the data store(s) 516, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks (e.g., a neural network implementing pose detection model 120) to be performed simultaneously and/or sequentially, and for the results to be combined together to enable Level 3-5 autonomous driving functionality. For example, a CNN executing on the DLA or dGPU (e.g., the GPU(s) 520) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 508.

In some examples, a CNN for facial recognition and vehicle owner identification may use data from camera sensors to identify the presence of an authorized driver and/or owner of the vehicle 500. The always on sensor processing engine may be used to unlock the vehicle when the owner approaches the driver door and turn on the lights, and, in security mode, to disable the vehicle when the owner leaves the vehicle. In this way, the SoC(s) 504 provide for security against theft and/or carjacking.

In another example, a CNN for emergency vehicle detection and identification may use data from microphones 596 to detect and identify emergency vehicle sirens. In contrast to conventional systems that use general classifiers to detect sirens and manually extract features, the SoC(s) 504 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 558. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 562, until the emergency vehicle(s) passes.

The vehicle may include a CPU(s) 518 (e.g., discrete CPU(s), or dCPU(s)), that may be coupled to the SoC(s) 504 via a high-speed interconnect (e.g., PCIe). The CPU(s) 518 may include an X86 processor, for example. The CPU(s) 518 may be used to perform any of a variety of functions, including arbitrating potentially inconsistent results between ADAS sensors and the SoC(s) 504, and/or monitoring the status and health of the controller(s) 536 and/or infotainment SoC 530, for example.

The vehicle 500 may include a GPU(s) 520 (e.g., discrete GPU(s), or dGPU(s)), that may be coupled to the SoC(s) 504 via a high-speed interconnect (e.g., NVIDIA's NVLINK). The GPU(s) 520 may provide additional artificial intelligence functionality, such as by executing redundant and/or different neural networks, and may be used to train and/or update neural networks based on input (e.g., sensor data) from sensors of the vehicle 500.

The vehicle 500 may further include the network interface 524 which may include one or more wireless antennas 526 (e.g., one or more wireless antennas for different communication protocols, such as a cellular antenna, a Bluetooth antenna, etc.). The network interface 524 may be used to enable wireless connectivity over the Internet with the cloud (e.g., with the server(s) 578 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 500 information about vehicles in proximity to the vehicle 500 (e.g., vehicles in front of, on the side of, and/or behind the vehicle 500). This functionality may be part of a cooperative adaptive cruise control functionality of the vehicle 500.

The network interface 524 may include a SoC that provides modulation and demodulation functionality and enables the controller(s) 536 to communicate over wireless networks. The network interface 524 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 500 may further include data store(s) 528 which may include off-chip (e.g., off the SoC(s) 504) storage. The data store(s) 528 may include one or more storage elements including RAM, SRAM, DRAM, VRAM, Flash, hard disks, and/or other components and/or devices that may store at least one bit of data.

The vehicle 500 may further include GNSS sensor(s) 558. The GNSS sensor(s) 558 (e.g., GPS, assisted GPS sensors, differential GPS (DGPS) sensors, etc.), to assist in mapping, perception, occupancy grid generation, and/or path planning functions. Any number of GNSS sensor(s) 558 may be used, including, for example and without limitation, a GPS using a USB connector with an Ethernet to Serial (RS-232) bridge.

The vehicle 500 may further include RADAR sensor(s) 560. The RADAR sensor(s) 560 may be used by the vehicle 500 for long-range vehicle detection, even in darkness and/or severe weather conditions. RADAR functional safety levels may be ASIL B. The RADAR sensor(s) 560 may use the CAN and/or the bus 502 (e.g., to transmit data generated by the RADAR sensor(s) 560) for control and to access object tracking data, with access to Ethernet to access raw data in some examples. A wide variety of RADAR sensor types may be used. For example, and without limitation, the RADAR sensor(s) 560 may be suitable for front, rear, and side RADAR use. In some example, Pulse Doppler RADAR sensor(s) are used.

The RADAR sensor(s) 560 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 560 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 500 surroundings at higher speeds with minimal interference from traffic in adjacent lanes. The other two antennae may expand the field of view, making it possible to quickly detect vehicles entering or leaving the vehicle's 500 lane.

Mid-range RADAR systems may include, as an example, a range of up to 560 m (front) or 80 m (rear), and a field of view of up to 42 degrees (front) or 550 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 500 may further include ultrasonic sensor(s) 562. The ultrasonic sensor(s) 562, which may be positioned at the front, back, and/or the sides of the vehicle 500, may be used for park assist and/or to create and update an occupancy grid. A wide variety of ultrasonic sensor(s) 562 may be used, and different ultrasonic sensor(s) 562 may be used for different ranges of detection (e.g., 2.5 m, 4 m). The ultrasonic sensor(s) 562 may operate at functional safety levels of ASIL B.

The vehicle 500 may include LIDAR sensor(s) 564. The LIDAR sensor(s) 564 may be used for object and pedestrian detection, emergency braking, collision avoidance, and/or other functions. The LIDAR sensor(s) 564 may be functional safety level ASIL B. In some examples, the vehicle 500 may include multiple LIDAR sensors 564 (e.g., two, four, six, etc.) that may use Ethernet (e.g., to provide data to a Gigabit Ethernet switch).

In some examples, the LIDAR sensor(s) 564 may be capable of providing a list of objects and their distances for a 360-degree field of view. Commercially available LIDAR sensor(s) 564 may have an advertised range of approximately 500 m, with an accuracy of 2 cm-3 cm, and with support for a 500 Mbps Ethernet connection, for example. In some examples, one or more non-protruding LIDAR sensors 564 may be used. In such examples, the LIDAR sensor(s) 564 may be implemented as a small device that may be embedded into the front, rear, sides, and/or corners of the vehicle 500. The LIDAR sensor(s) 564, in such examples, may provide up to a 120-degree horizontal and 35-degree vertical field-of-view, with a 200 m range even for low-reflectivity objects. Front-mounted LIDAR sensor(s) 564 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 500. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 564 may be less susceptible to motion blur, vibration, and/or shock.

The vehicle may further include IMU sensor(s) 566. The IMU sensor(s) 566 may be located at a center of the rear axle of the vehicle 500, in some examples. The IMU sensor(s) 566 may include, for example and without limitation, an accelerometer(s), a magnetometer(s), a gyroscope(s), a magnetic compass(es), and/or other sensor types. In some examples, such as in six-axis applications, the IMU sensor(s) 566 may include accelerometers and gyroscopes, while in nine-axis applications, the IMU sensor(s) 566 may include accelerometers, gyroscopes, and magnetometers.

In some embodiments, the IMU sensor(s) 566 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 566 may enable the vehicle 500 to estimate heading without requiring input from a magnetic sensor by directly observing and correlating the changes in velocity from GPS to the IMU sensor(s) 566. In some examples, the IMU sensor(s) 566 and the GNSS sensor(s) 558 may be combined in a single integrated unit.

The vehicle may include microphone(s) 596 placed in and/or around the vehicle 500. The microphone(s) 596 may be used for emergency vehicle detection and identification, among other things.

The vehicle may further include any number of camera types, including stereo camera(s) 568, wide-view camera(s) 570, infrared camera(s) 572, surround camera(s) 574, long-range and/or mid-range camera(s) 598, and/or other camera types. The cameras may be used to capture image data around an entire periphery of the vehicle 500. The types of cameras used depends on the embodiments and requirements for the vehicle 500, and any combination of camera types may be used to provide the necessary coverage around the vehicle 500. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 5A and FIG. 5B.

The vehicle 500 may further include vibration sensor(s) 542. The vibration sensor(s) 542 may measure vibrations of components of the vehicle, such as the axle(s). For example, changes in vibrations may indicate a change in road surfaces. In another example, when two or more vibration sensors 542 are used, the differences between the vibrations may be used to determine friction or slippage of the road surface (e.g., when the difference in vibration is between a power-driven axle and a freely rotating axle).

The vehicle 500 may include an ADAS system 538. The ADAS system 538 may include a SoC, in some examples. The ADAS system 538 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 560, LIDAR sensor(s) 564, and/or a camera(s). The ACC systems may include longitudinal ACC and/or lateral ACC. Longitudinal ACC monitors and controls the distance to the vehicle immediately ahead of the vehicle 500 and automatically adjust the vehicle speed to maintain a safe distance from vehicles ahead. Lateral ACC performs distance keeping, and advises the vehicle 500 to change lanes when necessary. Lateral ACC is related to other ADAS applications such as LCA and CWS.

CACC uses information from other vehicles that may be received via the network interface 524 and/or the wireless antenna(s) 526 from other vehicles via a wireless link, or indirectly, over a network connection (e.g., over the Internet). Direct links may be provided by a vehicle-to-vehicle (V2V) communication link, while indirect links may be infrastructure-to-vehicle (12V) communication link. In general, the V2V communication concept provides information about the immediately preceding vehicles (e.g., vehicles immediately ahead of and in the same lane as the vehicle 500), while the I2V communication concept provides information about traffic further ahead. CACC systems may include either or both I2V and V2V information sources. Given the information of the vehicles ahead of the vehicle 500, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 560, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 560, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 500 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 500 if the vehicle 500 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 560, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 500 is backing up. Some RCTW systems include AEB to ensure that the vehicle brakes are applied to avoid a crash. RCTW systems may use one or more rear-facing RADAR sensor(s) 560, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 500, the vehicle 500 itself must, in the case of conflicting results, decide whether to heed the result from a primary computer or a secondary computer (e.g., a first controller 536 or a second controller 536). For example, in some embodiments, the ADAS system 538 may be a backup and/or secondary computer for providing perception information to a backup computer rationality module. The backup computer rationality monitor may run a redundant diverse software on hardware components to detect faults in perception and dynamic driving tasks. Outputs from the ADAS system 538 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 504.

In other examples, ADAS system 538 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 538 may be fed into the primary computer's perception block and/or the primary computer's dynamic driving task block. For example, if the ADAS system 538 indicates a forward crash warning due to an object immediately ahead, the perception block may use this information when identifying objects. In other examples, the secondary computer may have its own neural network which is trained and thus reduces the risk of false positives, as described herein.

The vehicle 500 may further include the infotainment SoC 530 (e.g., an in-vehicle infotainment system (IVI)). Although illustrated and described as a SoC, the infotainment system may not be a SoC, and may include two or more discrete components. The infotainment SoC 530 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 500. For example, the infotainment SoC 530 may radios, disk players, navigation systems, video players, USB and Bluetooth connectivity, carputers, in-car entertainment, Wi-Fi, steering wheel audio controls, hands free voice control, a heads-up display (HUD), an HMI display 534, a telematics device, a control panel (e.g., for controlling and/or interacting with various components, features, and/or systems), and/or other components. The infotainment SoC 530 may further be used to provide information (e.g., visual and/or audible) to a user(s) of the vehicle, such as information from the ADAS system 538, autonomous driving information such as planned vehicle maneuvers, trajectories, surrounding environment information (e.g., intersection information, vehicle information, road information, etc.), and/or other information.

The infotainment SoC 530 may include GPU functionality. The infotainment SoC 530 may communicate over the bus 502 (e.g., CAN bus, Ethernet, etc.) with other devices, systems, and/or components of the vehicle 500. In some examples, the infotainment SoC 530 may be coupled to a supervisory MCU such that the GPU of the infotainment system may perform some self-driving functions in the event that the primary controller(s) 536 (e.g., the primary and/or backup computers of the vehicle 500) fail. In such an example, the infotainment SoC 530 may put the vehicle 500 into a chauffeur to safe stop mode, as described herein.

The vehicle 500 may further include an instrument cluster 532 (e.g., a digital dash, an electronic instrument cluster, a digital instrument panel, etc.). The instrument cluster 532 may include a controller and/or supercomputer (e.g., a discrete controller or supercomputer). The instrument cluster 532 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 530 and the instrument cluster 532. In other words, the instrument cluster 532 may be included as part of the infotainment SoC 530, or vice versa.

Figure 5D:
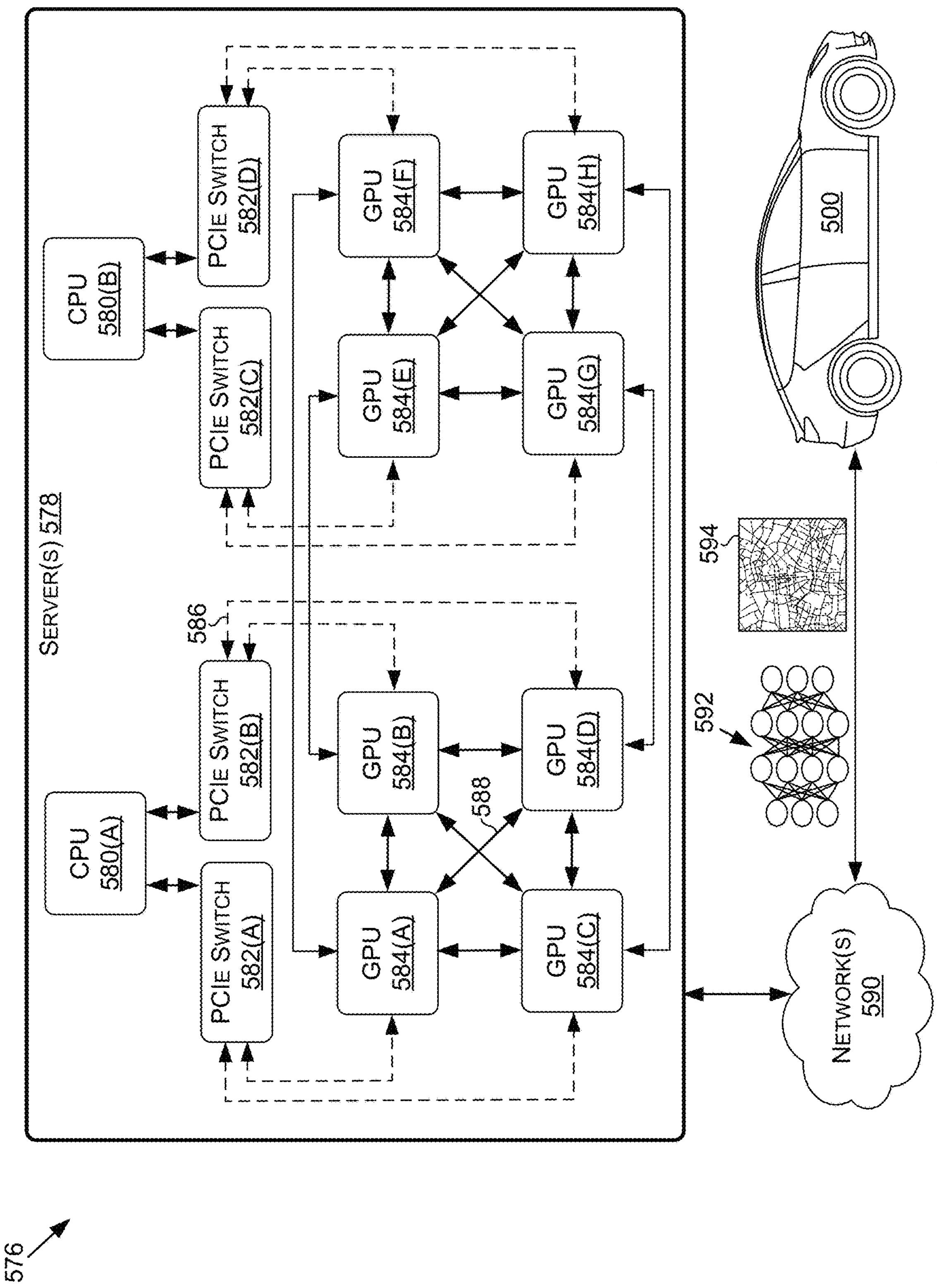
FIG. 5D is a system diagram for communication between cloud-based server(s) and the example autonomous vehicle of FIG. 5A, in accordance with some embodiments of the present disclosure.

FIG. 5D is a system diagram for communication between cloud-based server(s) and the example autonomous vehicle 500 of FIG. 5A, in accordance with some embodiments of the present disclosure. The system 576 may include server(s) 578, network(s) 590, and vehicles, including the vehicle 500. The server(s) 578 may include a plurality of GPUs 584(A)-584(H) (collectively referred to herein as GPUs 584), PCIe switches 582(A)-582(H) (collectively referred to herein as PCIe switches 582), and/or CPUs 580(A)-580(B) (collectively referred to herein as CPUs 580). The GPUs 584, the CPUs 580, and the PCIe switches may be interconnected with high-speed interconnects such as, for example and without limitation, NVLink interfaces 588 developed by NVIDIA and/or PCIe connections 586. In some examples, the GPUs 584 are connected via NVLink and/or NVSwitch SoC and the GPUs 584 and the PCIe switches 582 are connected via PCIe interconnects. Although eight GPUs 584, two CPUs 580, and two PCIe switches are illustrated, this is not intended to be limiting. Depending on the embodiment, each of the server(s) 578 may include any number of GPUs 584, CPUs 580, and/or PCIe switches. For example, the server(s) 578 may each include eight, sixteen, thirty-two, and/or more GPUs 584.

The server(s) 578 may receive, over the network(s) 590 and from the vehicles, image data representative of images showing unexpected or changed road conditions, such as recently commenced road-work. The server(s) 578 may transmit, over the network(s) 590 and to the vehicles, neural networks 592, updated neural networks 592, and/or map information 594, including information regarding traffic and road conditions. The updates to the map information 594 may include updates for the HD map 522, such as information regarding construction sites, potholes, detours, flooding, and/or other obstructions. In some examples, the neural networks 592, the updated neural networks 592, and/or the map information 594 may have resulted from new training and/or experiences represented in data received from any number of vehicles in the environment, and/or based on training performed at a datacenter (e.g., using the server(s) 578 and/or other servers).

The server(s) 578 may be used to train machine learning models (e.g., neural networks) based on training data. For example, in some embodiments, system 100 for training pose detection model 120 as described herein may be implemented at least in part by the server(s) 578. The training data (e.g., such as multi-view image sensor data 107) may in part be generated by the vehicles, sensors temporarily installed in the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 590, and/or the machine learning models may be used by the server(s) 578 to remotely monitor the vehicles.

In some examples, the server(s) 578 may receive data from the vehicles and apply the data to up-to-date real-time neural networks for real-time intelligent inferencing. The server(s) 578 may include deep-learning supercomputers and/or dedicated AI computers powered by GPU(s) 584, such as a DGX and DGX Station machines developed by NVIDIA. However, in some examples, the server(s) 578 may include deep learning infrastructure that use only CPU-powered datacenters.

The deep-learning infrastructure of the server(s) 578 may be capable of fast, real-time inferencing, and may use that capability to evaluate and verify the health of the processors, software, and/or associated hardware in the vehicle 500. For example, the deep-learning infrastructure may receive periodic updates from the vehicle 500, such as a sequence of images and/or objects that the vehicle 500 has located in that sequence of images (e.g., via computer vision and/or other machine learning object classification techniques). The deep-learning infrastructure may run its own neural network to identify the objects and compare them with the objects identified by the vehicle 500 and, if the results do not match and the infrastructure concludes that the AI in the vehicle 500 is malfunctioning, the server(s) 578 may transmit a signal to the vehicle 500 instructing a fail-safe computer of the vehicle 500 to assume control, notify the passengers, and complete a safe parking maneuver.

For inferencing, the server(s) 578 may include the GPU(s) 584 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 6:
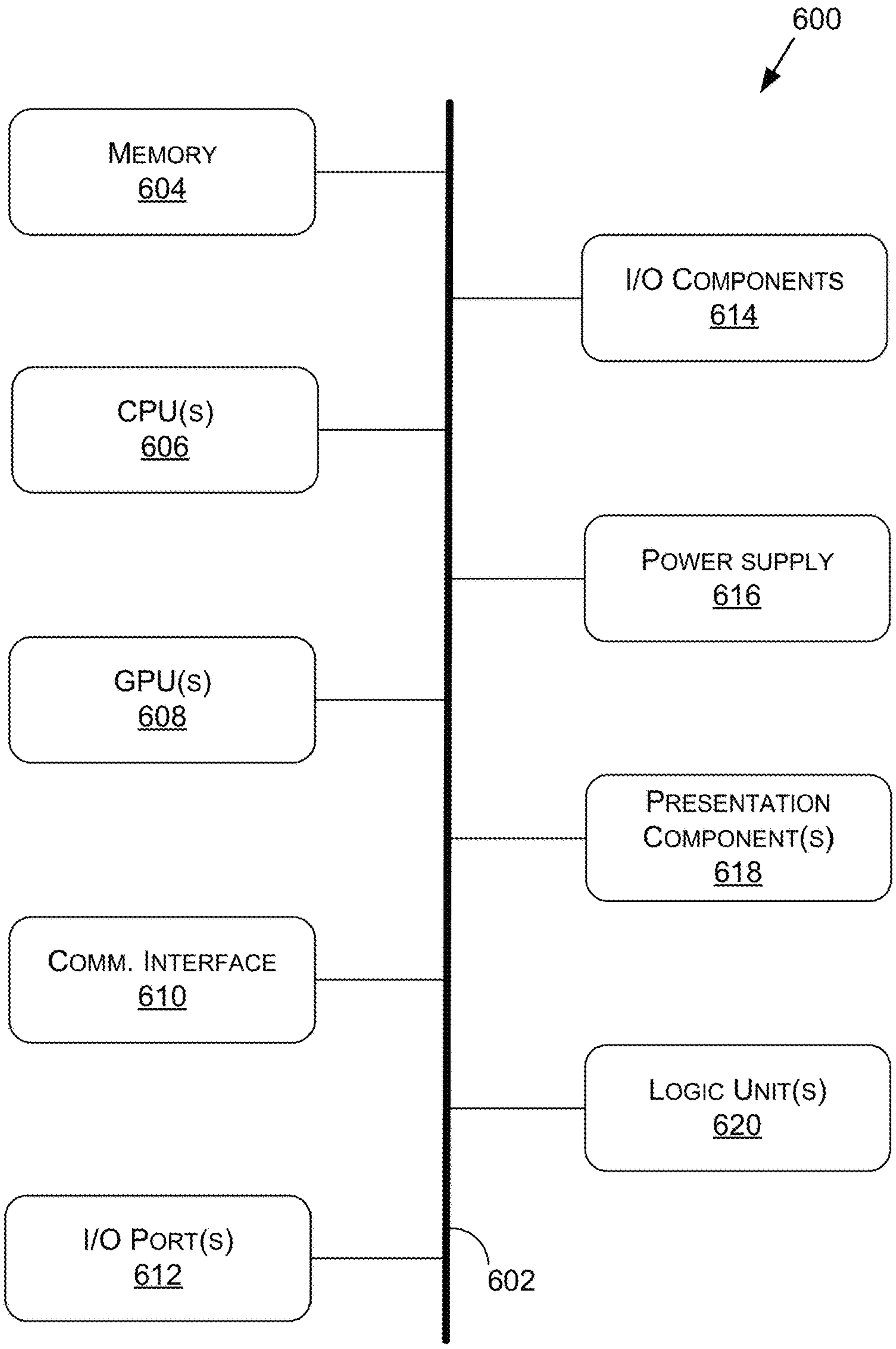
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. For example, in some embodiments, system 100 for training pose detection model 120 as described herein may be implemented at least in part by the computing device(s) 600.

Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as “workstation,” “server,” “laptop,” “desktop,” “tablet,” “client device,” “mobile device,” “hand-held device,” “game console,” “electronic control unit (ECU),” “virtual reality system,” and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term “modulated data signal” may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 620 and/or communication interface 610 may include one or more data processing units (DPUs) to transmit data received over a network and/or through interconnect system 602 directly to (e.g., a memory of) one or more GPU(s) 608.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, DPUs, etc.), and output the data (e.g., as an image, video, sound, etc.).

Example Data Center

Figure 7:
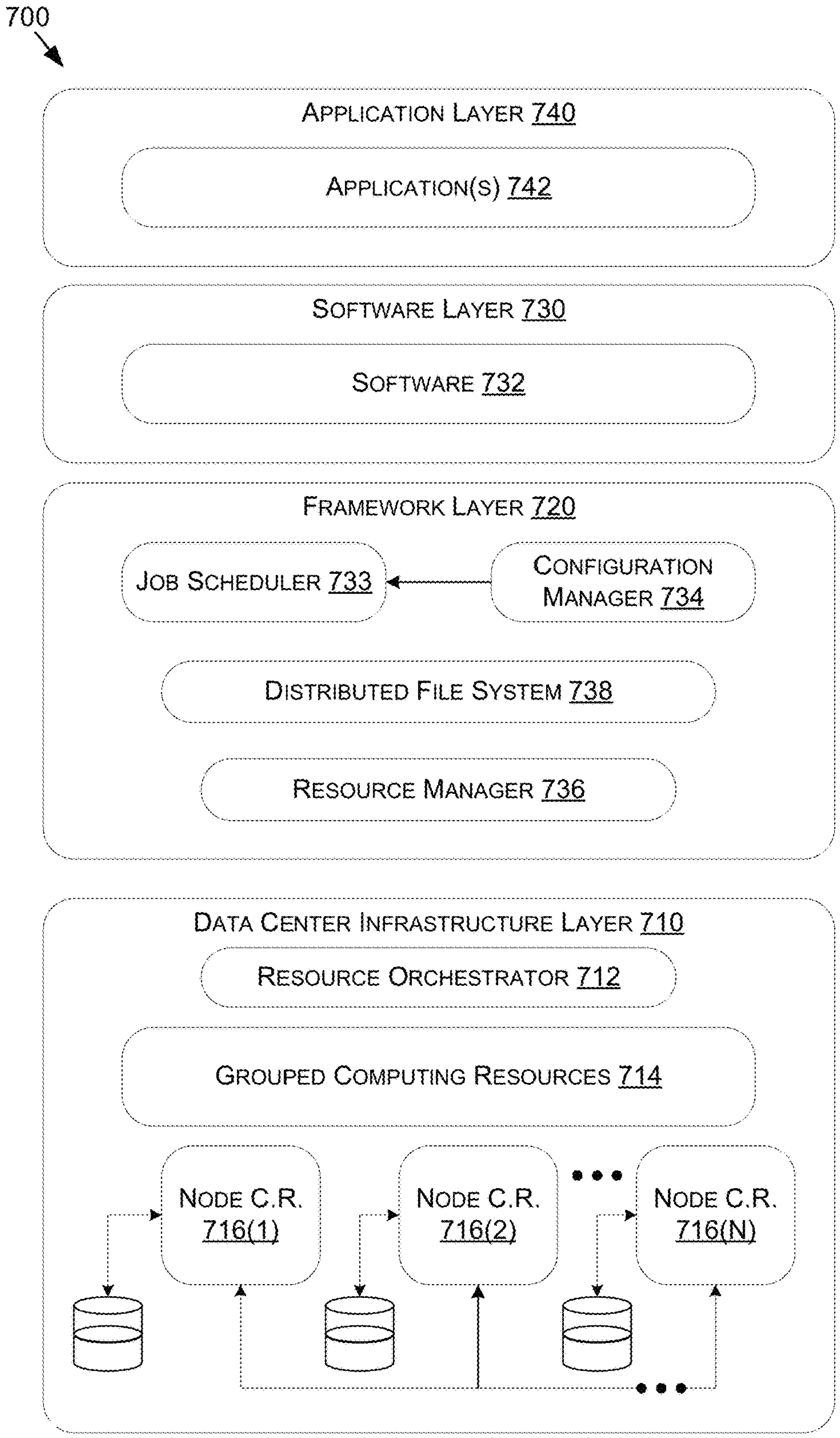
FIG. 7 is a block diagram of an example data center suitable for use in implementing some embodiments of the present disclosure.

FIG. 7 illustrates an example data center 700 that may be used in at least one embodiments of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-7161(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 712 may configure or otherwise control one or more node C.R.s 716(1)-716(N) and/or grouped computing resources 714. In at least one embodiment, resource orchestrator 712 may include a software design infrastructure (SDI) management entity for the data center 700. The resource orchestrator 712 may include hardware, software, or some combination thereof.

In at least one embodiment, as shown in FIG. 7, framework layer 720 may include a job scheduler 733, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. In some embodiments, one or more aspects of the system 100 for training pose detection model 120 as described herein may be implemented at least in part by the software 732 and/or application(s) 742. The framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 733 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 733. In at least one embodiment, clustered or grouped computing resources may include grouped computing resource 714 at data center infrastructure layer 710. The resource manager 736 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., “big data”).

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of “and/or” with respect to two or more elements should be interpreted to mean only one element, or a combination of elements. For example, “element A, element B, and/or element C” may include only element A, only element B, only element C, element A and element B, element A and element C, element B and element C, or elements A, B, and C. In addition, “at least one of element A or element B” may include at least one of element A, at least one of element B, or at least one of element A and at least one of element B. Further, “at least one of element A and element B” may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms “step” and/or “block” may be used herein to connote different elements of methods employed, the terms should not be interpreted as implying any particular order among or between various steps herein disclosed unless and except when the order of individual steps is explicitly described.

What is claimed is:

1. A system comprising:

one or more processing units to:

apply to at least one pose detection model, multi-view image sensor training data comprising two-dimensional optical image data representing an occupant of a machine, the two-dimensional optical image data captured from a plurality of viewpoints by a plurality of synchronized optical image sensors;

input reference depth data representing the occupant derived from a depth sensor synchronized with the plurality of synchronized optical image sensors;

generate a plurality of three-dimensional pose estimates of the occupant based on the two-dimensional optical image data captured from the plurality of viewpoints;

generate a loss feedback comprising at least an alignment loss representing an alignment between the plurality of three-dimensional pose estimates for one or more kinematic elements of the occupant and a pose depth loss representing a difference between a depth of the one or more kinematic elements represented by the plurality of three-dimensional pose estimates and a depth of the one or more kinematic elements represented by the reference depth data; and adjust the at least one pose detection model based on the loss feedback.

2. The system of claim 1, wherein the one or more processing units are further to:

apply at least one calibration parameter for the plurality of synchronized optical image sensors to at least one three-dimensional pose estimate of the plurality of three-dimensional pose estimates to map the plurality of three-dimensional pose estimates to a common three-dimensional coordinate reference frame.

3. The system of claim 1, wherein the one or more kinematic elements correspond to at least one body joint of the occupant, or at least one body limb of the occupant.

4. The system of claim 1, wherein the reference depth data comprises an image frame of pixels where pixel values correspond at least to a distance from the depth sensor to the occupant.

5. The system of claim 1, wherein the one or more processing units are further to:

apply at least one calibration parameter to map the reference depth data and the plurality of three-dimensional pose estimates to a common three-dimensional coordinate reference frame.

6. The system of claim 1, wherein the one or more processing units are further to:

input three-dimensional ground truth subject data representing ground truth values corresponding to the one or more kinematic elements of the occupant; and generate a kinematic loss representing a correlation based on a length of at least a first body limb of the one or more kinematic elements represented by the plurality of three-dimensional pose estimates and the length of at least the first body limb of the one or more kinematic elements represented by the three-dimensional ground truth subject data, wherein the loss feedback further comprises the kinematic loss.

7. The system of claim 6, wherein the three-dimensional ground truth subject data is derived at least from a three-dimensional size of the occupant detected from a plurality of image frames representing a pose of the occupant captured from different viewpoints.

8. The system of claim 6, wherein the three-dimensional ground truth subject data is derived from a plurality of image frames synchronously captured from different viewpoints of the occupant by a plurality of sensors.

9. The system of claim 6, wherein the three-dimensional ground truth subject data is derived at least from a set of kinematic elements detected from a plurality of image frames representing a pose of the occupant captured from different viewpoints.

10. The system of claim 1, wherein the one or more processing units are further to:

apply to the at least one pose detection model, three-dimensional ground truth subject data representing ground truth values corresponding to the one or more kinematic elements of the occupant; and generate the plurality of three-dimensional pose estimates of the occupant further based on the three-dimensional ground truth subject data.

11. The system of claim 1, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for generating or presenting at least one of virtual reality content, augmented reality content, or mixed reality content;

a system for performing deep learning operations;

a system for performing real-time streaming;

a system implemented using an edge device;

a system implemented using a robot;

a system for performing conversational AI operations;

a system for performing operations using one or more language models;

a system for generating synthetic data;

a system incorporating one or more virtual machines (VMs);

a system implemented at least partially in a data center;

a system for performing generative AI operations;

a system implemented at least partially using a language model; or a system implemented at least partially using cloud computing resources.

12. At least one processor comprising:

one or more processing units to:

operate at least one pose detection model to generate a plurality of three-dimensional pose estimates of an occupant based on two-dimensional optical image data captured from a plurality of viewpoints;

input reference depth data representing the occupant derived from a depth sensor;

generate a loss feedback comprising at least an alignment loss representing an alignment between the plurality of three-dimensional pose estimates and a pose depth loss representing a difference between a depth of one or more kinematic elements represented by the plurality of three-dimensional pose estimates and a depth of the one or more kinematic elements represented by the reference depth data; and adjust the at least one pose detection model based on the loss feedback.

13. The at least one processor of claim 12, wherein the two-dimensional optical image data is captured from the plurality of viewpoints by a plurality of synchronized optical image sensors.

14. The at least one processor of claim 12, wherein the one or more processing units are further to:

generate the alignment loss representing the alignment between the plurality of three-dimensional pose estimates based on one or more kinematic elements of the occupant.

15. The at least one processor of claim 12, wherein the one or more processing units are further to:

input three-dimensional ground truth subject data representing ground truth values corresponding to one or more kinematic elements of the occupant; and generate a kinematic loss representing a correlation based on a length of at least a first body limb of the one or more kinematic elements represented by the plurality of three-dimensional pose estimates and the length of at least the first body limb of the one or more kinematic elements represented by the three-dimensional ground truth subject data, wherein the loss feedback further comprises the kinematic loss.

16. The at least one processor of claim 15, wherein the three-dimensional ground truth subject data is derived from a plurality of image frames synchronously captured from different viewpoints of the occupant by a plurality of sensors.

17. The at least one processor of claim 12, wherein the at least one processor is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for generating or presenting at least one of virtual reality content, augmented reality content, or mixed reality content;

a system for performing deep learning operations;

a system for performing real-time streaming;

a system implemented using an edge device;

a system implemented using a robot;

a system for performing conversational AI operations;

a system for performing operations using one or more language models;

a system for generating synthetic data;

a system incorporating one or more virtual machines (VMs);

a system implemented at least partially in a data center;

a system for performing generative AI operations;

a system implemented at least partially using a language model; or a system implemented at least partially using cloud computing resources.

18. A method comprising:

predicting a plurality of three-dimensional pose estimates of an occupant using at least one pose detection model based at least on two-dimensional optical image data captured from a plurality of viewpoints, and adjusting the at least one pose detection model based at least on an alignment loss representing an alignment of one or more kinematic elements of the occupant between the plurality of three-dimensional pose estimates and a pose depth loss representing a difference between a depth of the one or more kinematic elements represented by the plurality of three-dimensional pose estimates and a depth of the one or more kinematic elements represented by reference depth data derived from a depth sensor.

* * * * *